United States Patent
Rambo

(10) Patent No.: US 12,196,136 B2
(45) Date of Patent: Jan. 14, 2025

(54) REGENERATIVE FUEL HEATING SYSTEM

(71) Applicant: General Electric Company, Schenectady, NY (US)

(72) Inventor: Jeffrey Douglas Rambo, Mason, OH (US)

(73) Assignee: General Electric Company, Evendale, OH (US)

( * ) Notice: Subject to any disclaimer, the term of this patent is extended or adjusted under 35 U.S.C. 154(b) by 263 days.

(21) Appl. No.: 17/128,704

(22) Filed: Dec. 21, 2020

(65) Prior Publication Data
US 2022/0195927 A1    Jun. 23, 2022

(51) Int. Cl.
| | |
|---|---|
| *F02C 7/224* | (2006.01) |
| *F02C 6/08* | (2006.01) |
| *F02C 7/232* | (2006.01) |
| *F02C 9/26* | (2006.01) |
| *F02C 9/40* | (2006.01) |

(52) U.S. Cl.
CPC .............. *F02C 7/224* (2013.01); *F02C 6/08* (2013.01); *F02C 7/232* (2013.01); *F02C 9/263* (2013.01); *F02C 9/40* (2013.01); *F05D 2260/213* (2013.01); *F05D 2260/232* (2013.01)

(58) Field of Classification Search
CPC ............................. F02C 7/224; B64D 37/34
USPC ................................................ 123/447, 557
See application file for complete search history.

(56) References Cited

U.S. PATENT DOCUMENTS

| | | | | |
|---|---|---|---|---|
| 2,689,606 | A | * | 9/1954 | Mock ........................ F02C 7/22 137/53 |
| 2,759,424 | A | * | 8/1956 | Defibaugh ............. B64D 37/20 137/565.33 |
| 4,404,793 | A | * | 9/1983 | Coffinberry ............. F02C 7/224 60/785 |
| 4,505,124 | A | | 3/1985 | Mayer |
| 4,705,100 | A | | 11/1987 | Black et al. |
| 4,714,139 | A | | 12/1987 | Lorenz et al. |
| 4,773,212 | A | * | 9/1988 | Griffin .................... F02C 7/224 60/39.83 |
| 4,776,536 | A | | 10/1988 | Hudson et al. |
| 5,558,303 | A | | 9/1996 | Koethe et al. |

(Continued)

OTHER PUBLICATIONS

Co-pending U.S. Appl. No. 17/128,642, filed Dec. 21, 2020.
Co-pending U.S. Appl. No. 17/128,675, filed Dec. 21, 2020.

*Primary Examiner* — Todd E Manahan
*Assistant Examiner* — Marc J Amar
(74) *Attorney, Agent, or Firm* — Dority & Manning, P.A.

(57) ABSTRACT

Systems and methods for operating systems are provided. For example, a system comprises a heat source for providing a flow of a hot fluid and a fuel flowpath for a flow of a fuel. The fuel flowpath includes a fuel accumulator and a heat exchanger for heat transfer between the hot fluid and fuel. The heat exchanger includes a hot fluid inlet for receipt of the hot fluid at an inlet temperature and a fuel inlet for receipt of the fuel at an inlet temperature. The hot fluid inlet temperature is greater than the fuel inlet temperature such that the fuel is heated through heat transfer with the hot fluid in the heat exchanger. The fuel accumulator accumulates at least a portion of the heated fuel. An exemplary system is selectively operated to heat and circulate the fuel through the fuel flowpath for consumption and/or accumulation in the fuel accumulator.

16 Claims, 10 Drawing Sheets

(56) References Cited

U.S. PATENT DOCUMENTS

| | | | | |
|---|---|---|---|---|
| 6,105,370 | A * | 8/2000 | Weber | F02C 7/14 60/260 |
| 6,182,435 | B1 * | 2/2001 | Niggemann | F01D 25/12 60/730 |
| 6,415,595 | B1 | 7/2002 | Wilmot, Jr. et al. | |
| 7,055,505 | B2 | 6/2006 | Washeleski et al. | |
| 7,260,926 | B2 | 8/2007 | Sabatino et al. | |
| 7,984,606 | B2 | 7/2011 | Smith | |
| 8,042,343 | B2 | 10/2011 | Jarlestal | |
| 8,132,398 | B2 * | 3/2012 | Wang | F02C 7/32 60/736 |
| 8,261,527 | B1 * | 9/2012 | Stearns | F02C 7/06 60/39.83 |
| 8,522,572 | B2 | 9/2013 | Coffinberry et al. | |
| 8,677,755 | B2 | 3/2014 | Bulin et al. | |
| 9,074,562 | B2 | 7/2015 | Tsutsumi et al. | |
| 9,151,180 | B2 | 10/2015 | Veilleux, Jr. | |
| 9,334,802 | B2 | 5/2016 | Papa et al. | |
| 9,561,857 | B2 | 2/2017 | Weber | |
| 9,604,730 | B2 | 3/2017 | Hagh et al. | |
| 9,687,773 | B2 | 6/2017 | Johnson et al. | |
| 9,823,030 | B2 | 11/2017 | Veilleux, Jr. | |
| 10,086,222 | B2 | 10/2018 | Tichborne et al. | |
| 10,352,241 | B2 | 7/2019 | Snape et al. | |
| 10,526,971 | B2 | 1/2020 | Mastrocola et al. | |
| 11,560,239 | B2 | 1/2023 | Rambo et al. | |
| 2003/0136103 | A1 * | 7/2003 | Reuter | F02C 7/236 60/734 |
| 2004/0194627 | A1 | 10/2004 | Huang et al. | |
| 2007/0101731 | A1 | 5/2007 | Bayt et al. | |
| 2009/0313999 | A1 * | 12/2009 | Hunter | F02C 7/18 60/730 |
| 2010/0319359 | A1 | 12/2010 | Holt et al. | |
| 2012/0297780 | A1 | 11/2012 | Bruno et al. | |
| 2012/0297789 | A1 | 11/2012 | Coffinberry | |
| 2013/0086909 | A1 | 4/2013 | Wang et al. | |
| 2014/0102113 | A1 | 4/2014 | Cuevas et al. | |
| 2014/0130478 | A1 | 5/2014 | Pemmi et al. | |
| 2014/0341256 | A1 * | 11/2014 | Azeem | G01K 3/005 374/165 |
| 2015/0048617 | A1 * | 2/2015 | Veilleux, Jr. | F02C 7/224 165/103 |
| 2016/0280387 | A1 | 9/2016 | Snape et al. | |
| 2017/0058774 | A1 * | 3/2017 | Pickford | F02C 7/16 |
| 2017/0167307 | A1 | 6/2017 | Scipio et al. | |
| 2017/0233083 | A1 * | 8/2017 | Behrens | B64D 13/06 62/79 |
| 2018/0155046 | A1 | 6/2018 | Bowman et al. | |
| 2018/0229849 | A1 * | 8/2018 | Behrens | B64D 13/06 |
| 2020/0088098 | A1 * | 3/2020 | Roberge | F02C 7/16 |
| 2020/0130858 | A1 * | 4/2020 | Julien | F01M 5/002 |
| 2020/0191057 | A1 | 6/2020 | Cocks | |
| 2020/0332714 | A1 | 10/2020 | Ribarov | |
| 2020/0332716 | A1 * | 10/2020 | Ribarov | F02C 7/185 |

\* cited by examiner

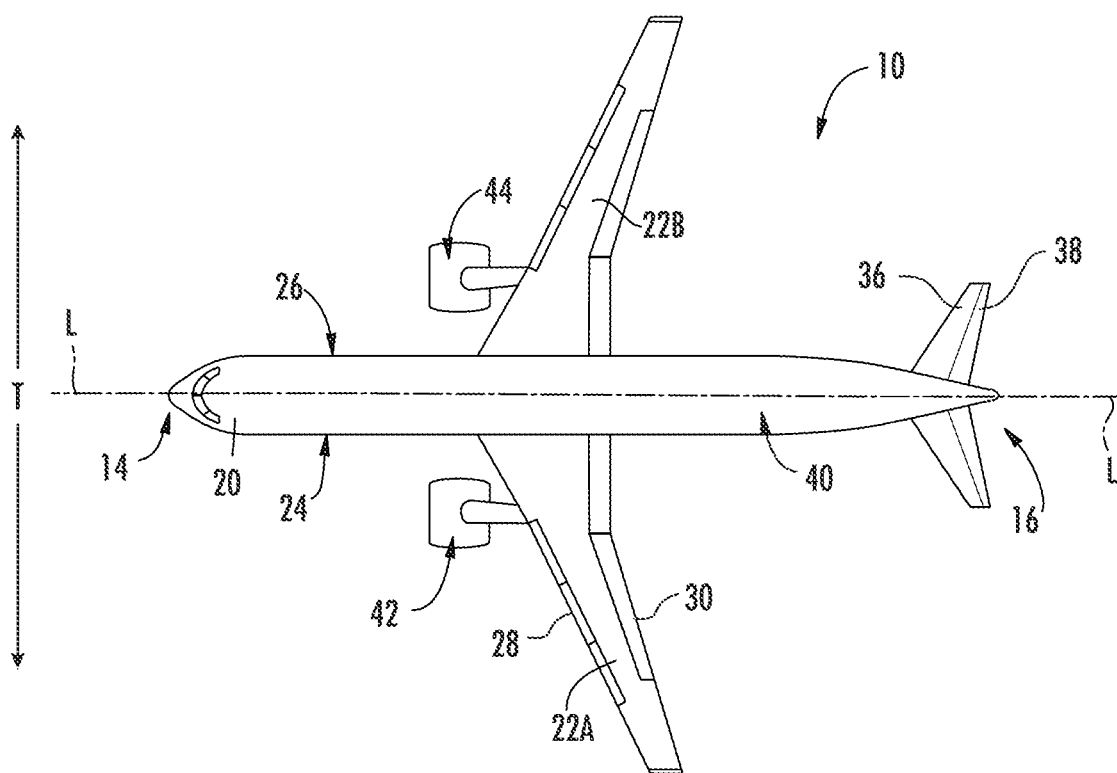
FIG. - 1A -
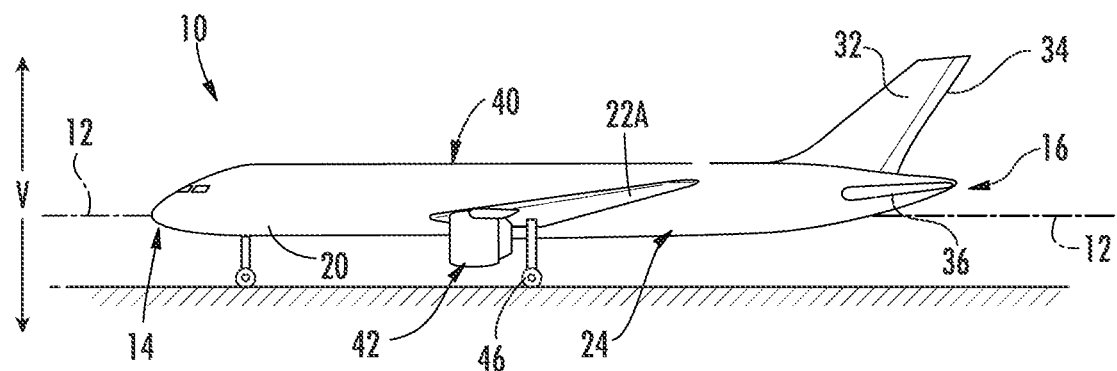
FIG. - 1B -

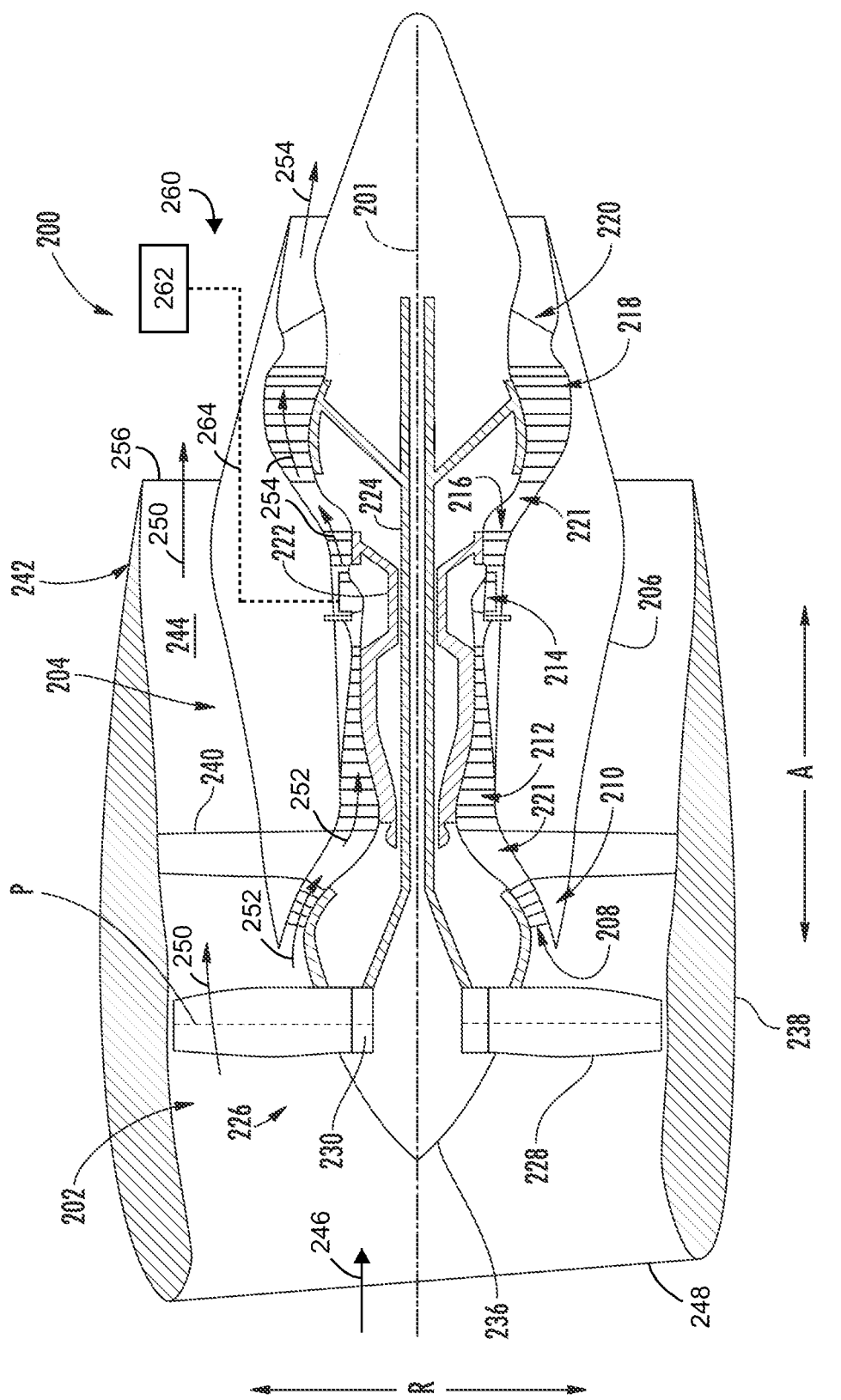
FIG. -1C-

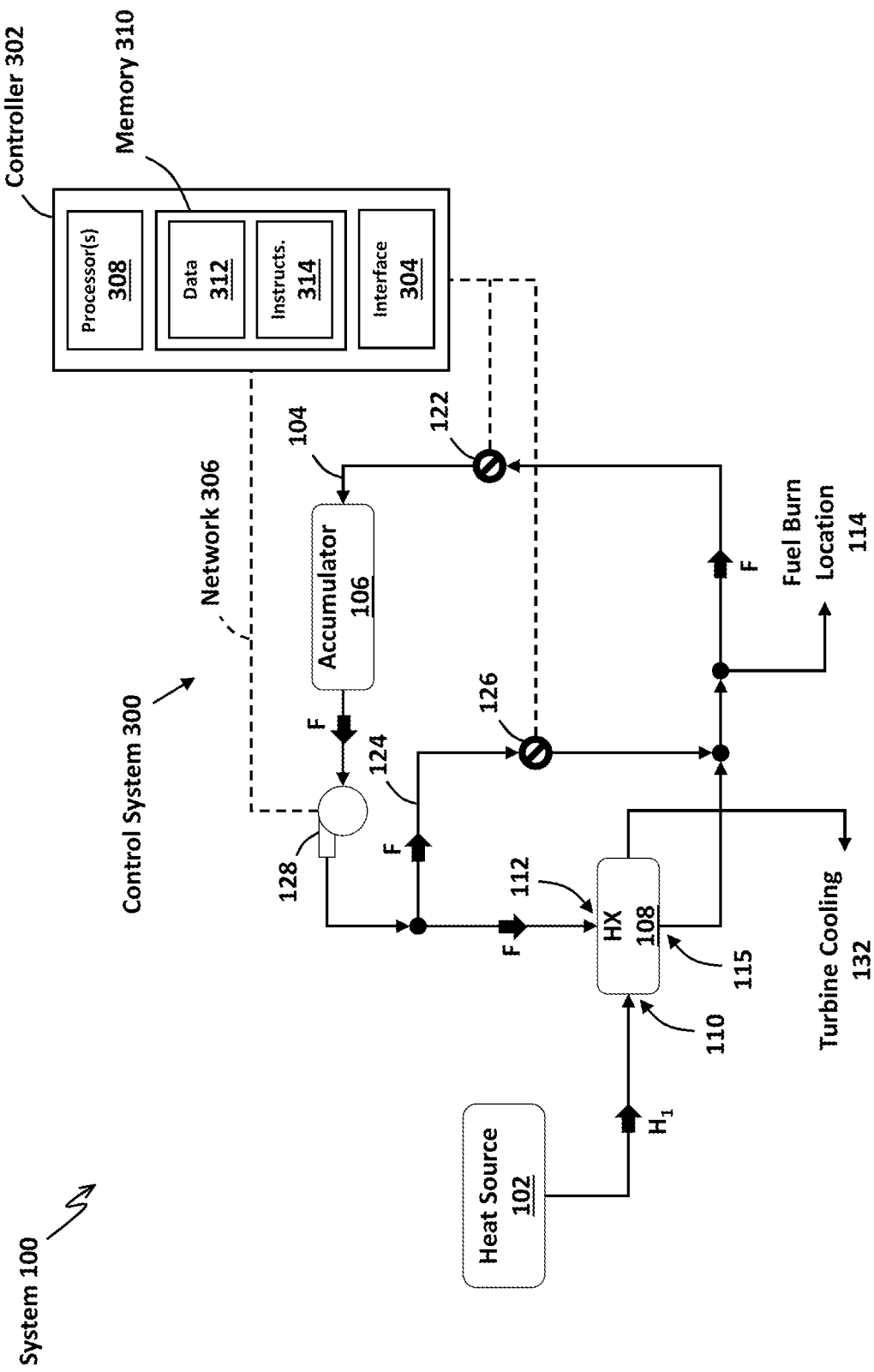
FIG. —2—

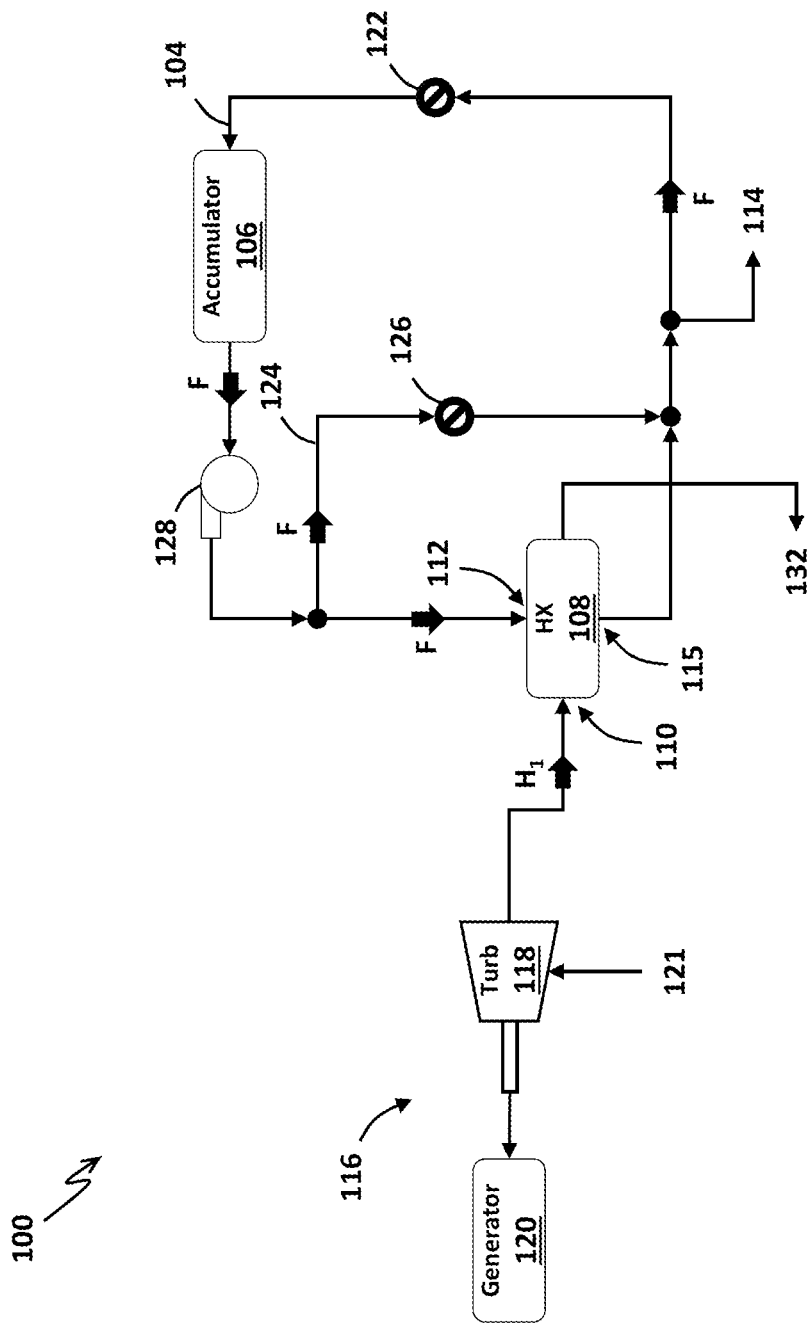
FIG. – 3 –

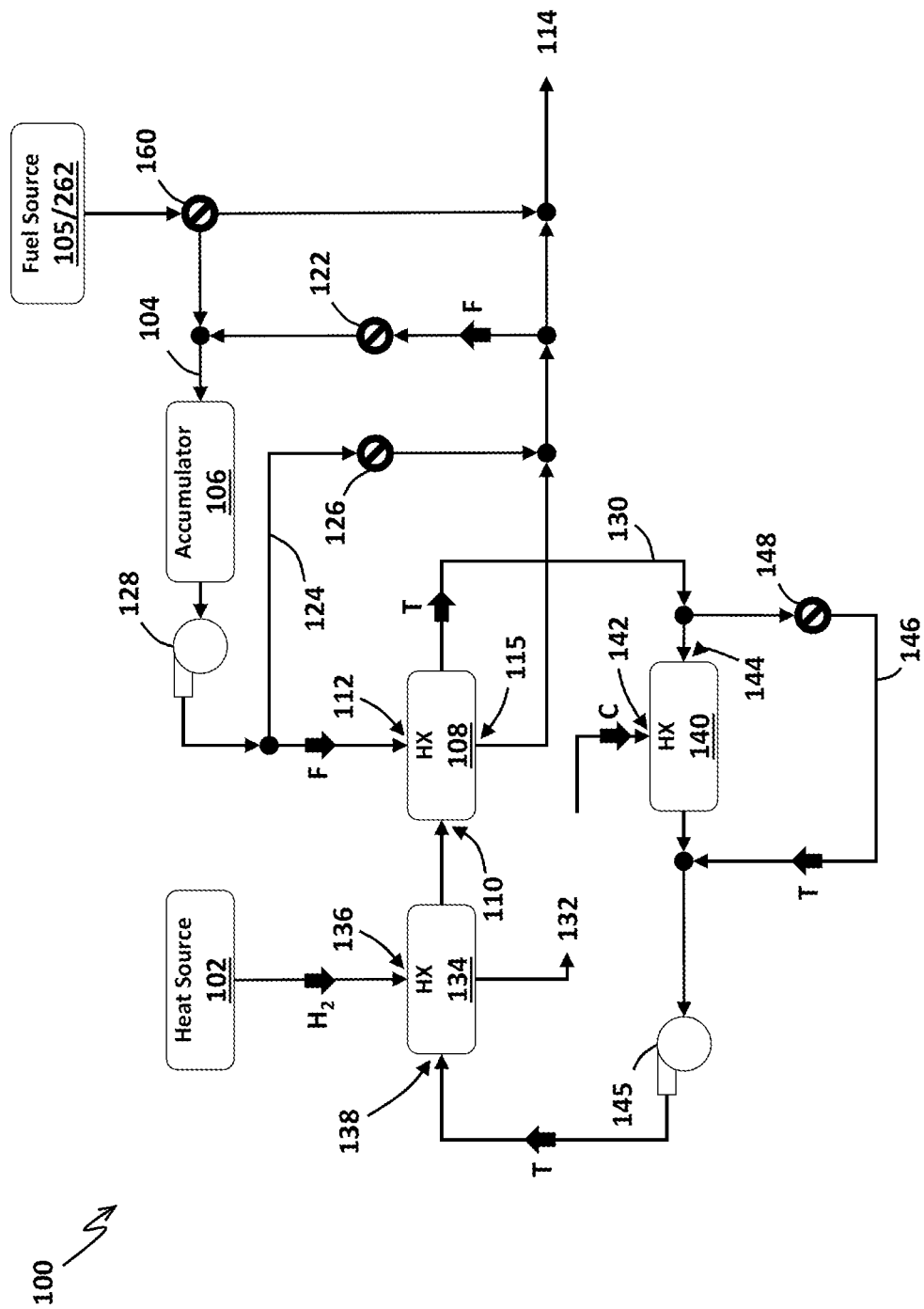
FIG. —4—

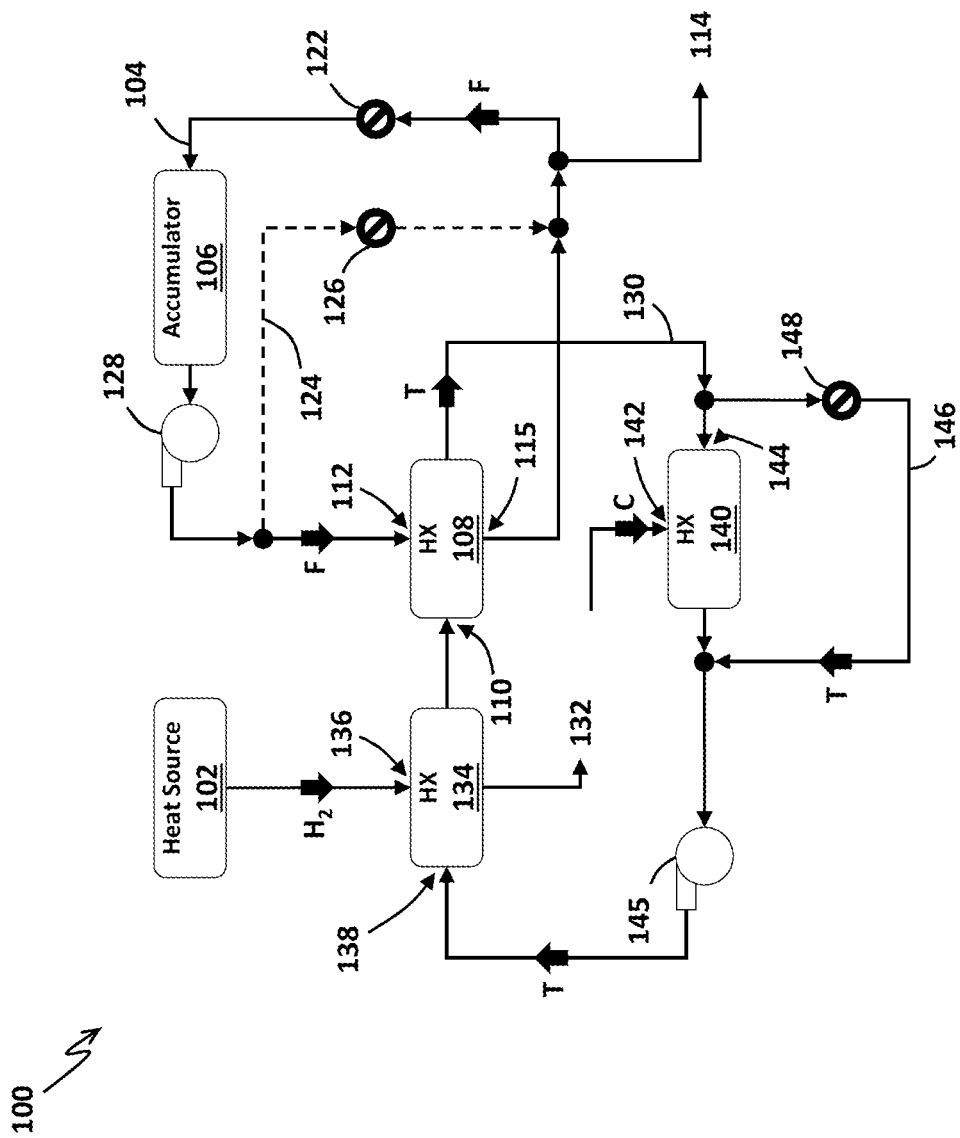
FIG. -5A-

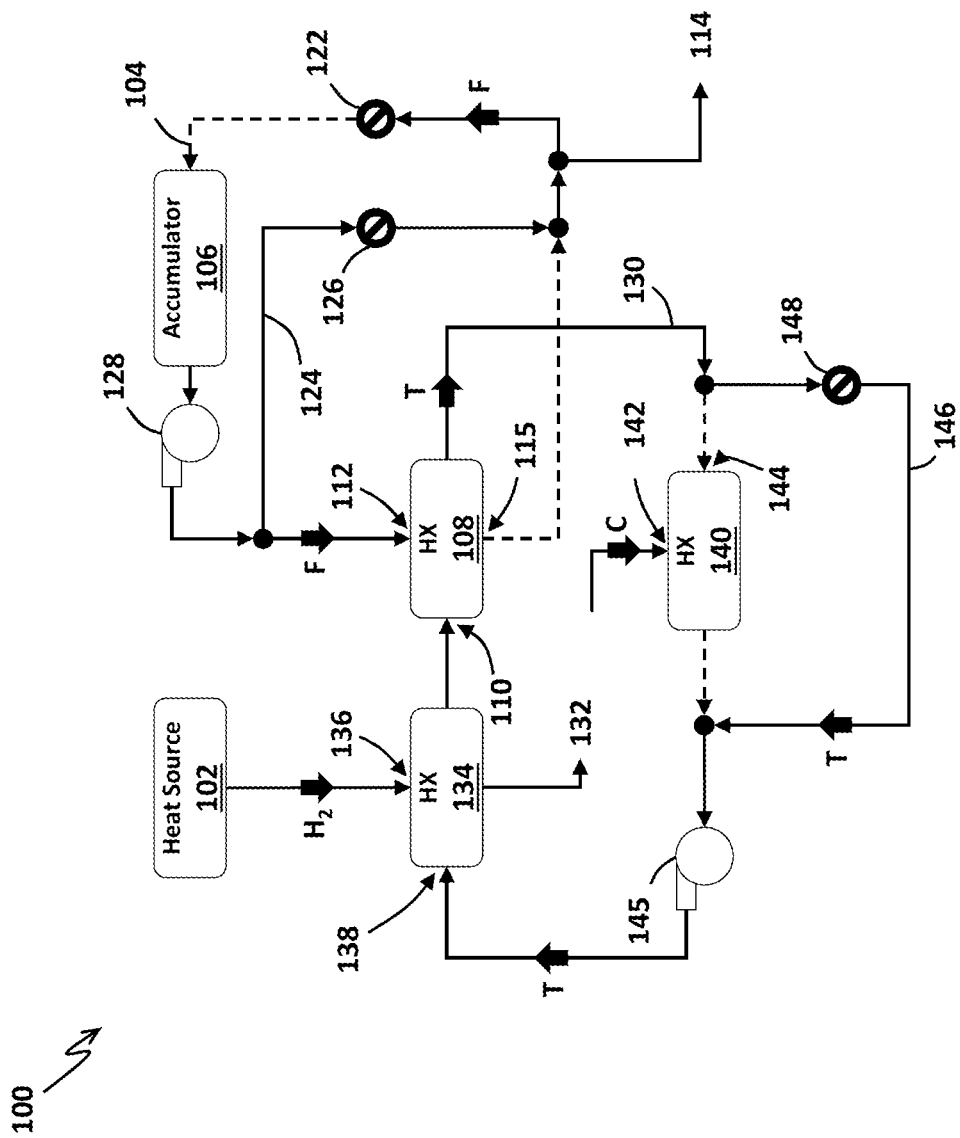
FIG. — 5B —

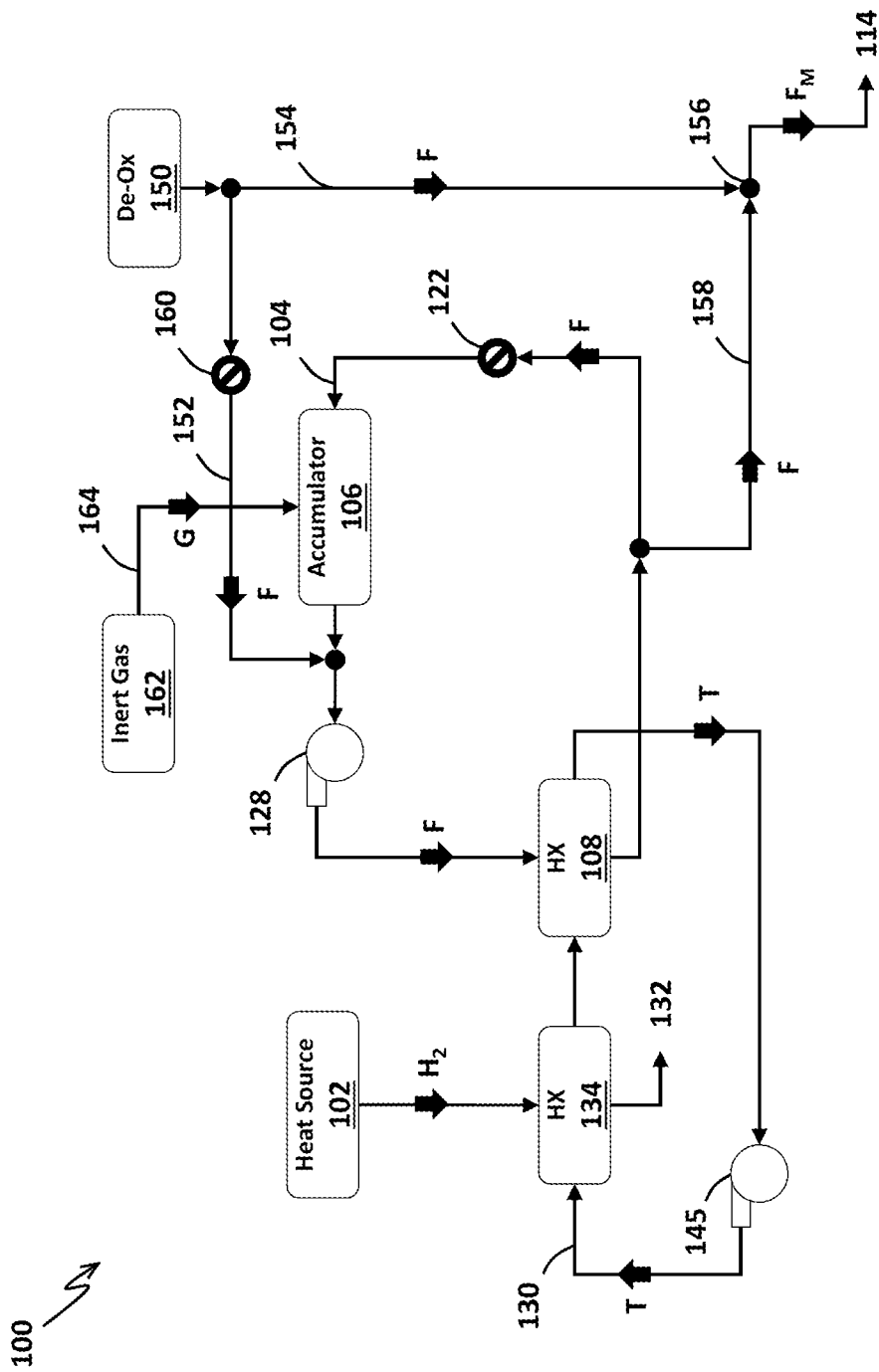
FIG. – 6 –

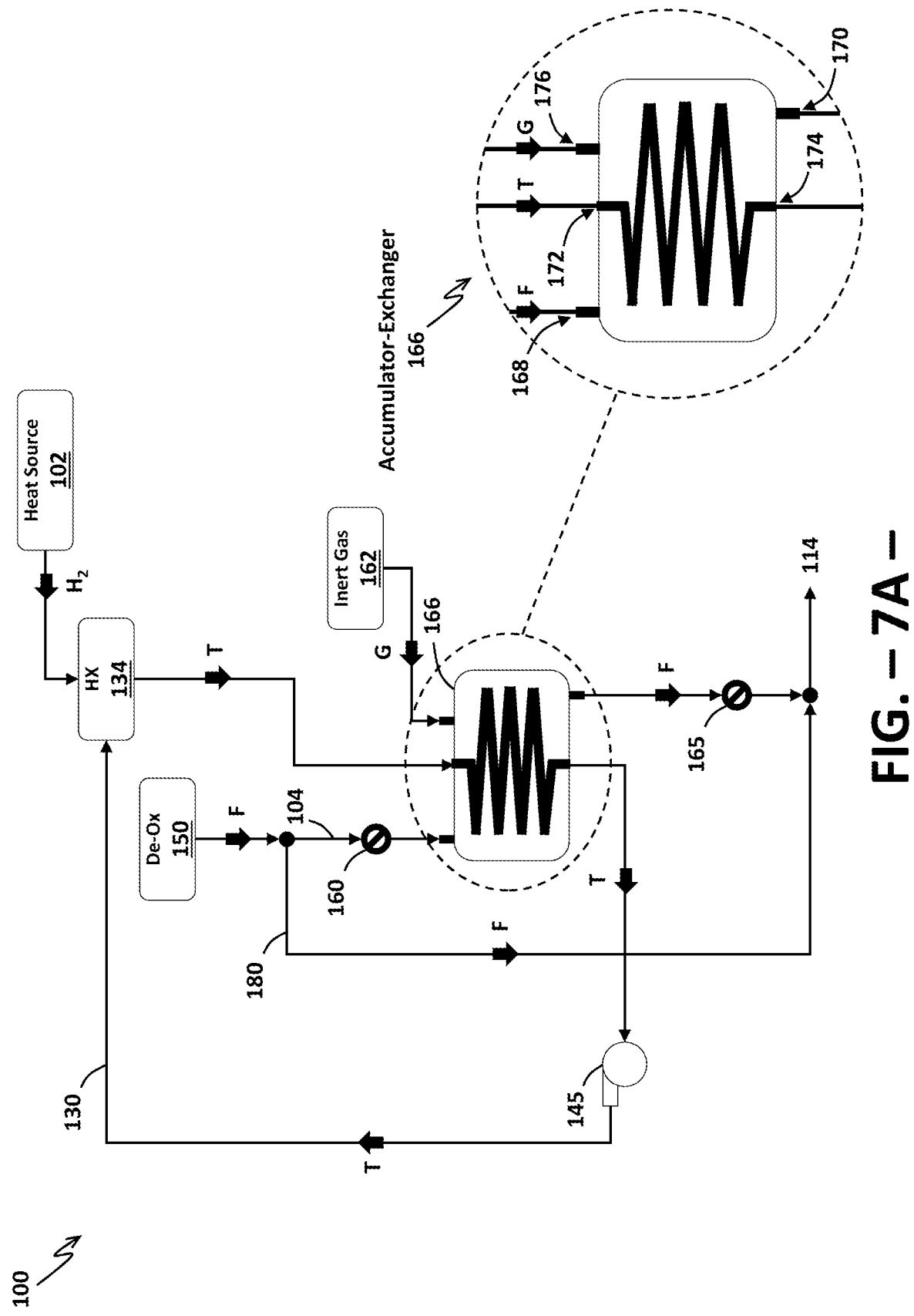
FIG. -7A-

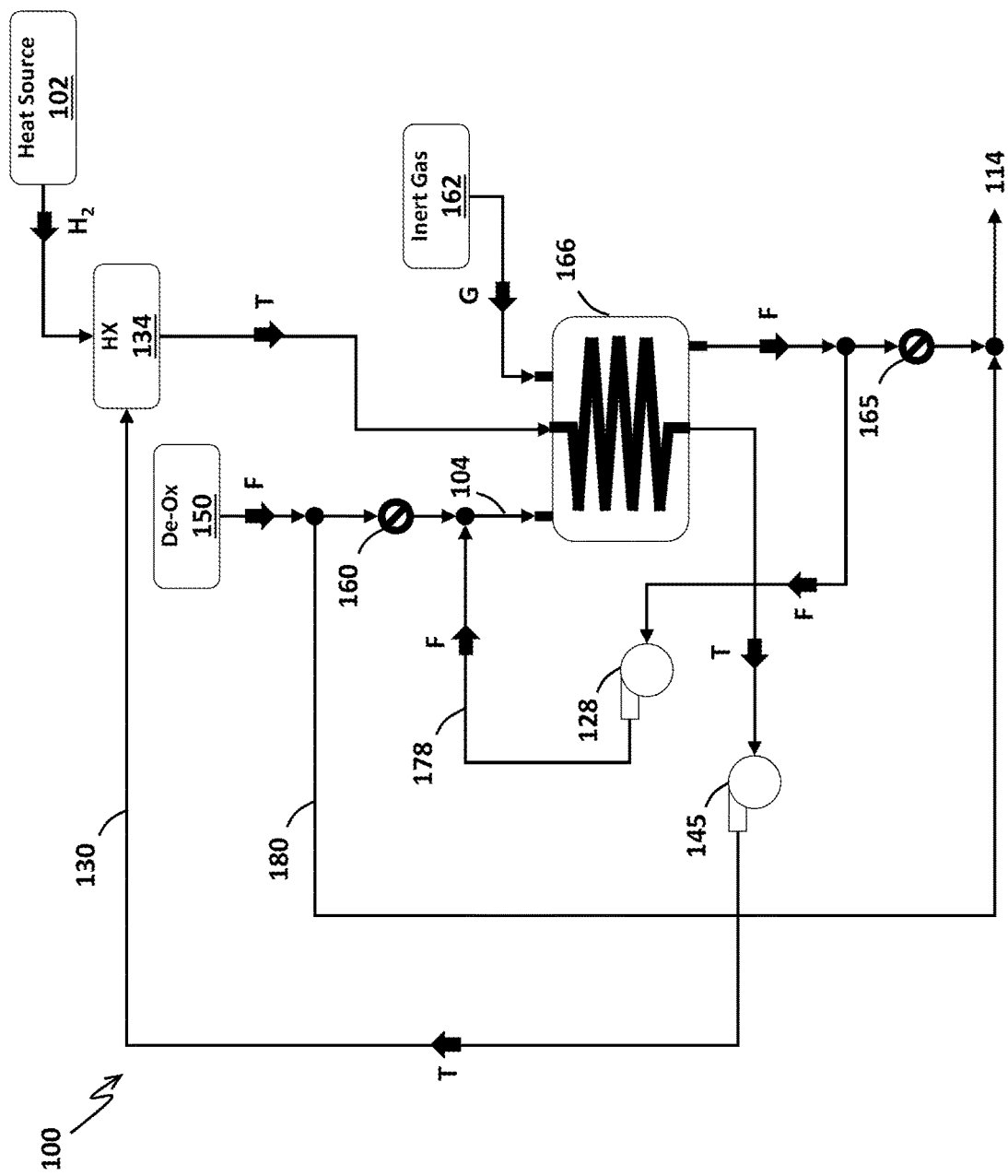
FIG. — 7B —

REGENERATIVE FUEL HEATING SYSTEM

FIELD

The present subject matter relates generally to thermal management systems and, more particularly, to thermal management systems utilizing heated fuel.

BACKGROUND

Vehicles such as aircraft, as well as engines such as gas turbine engines that may be used, e.g., for power generation for such vehicles or for other applications, typically have one or more systems that generate heat. Usually, thermal management systems (TMS) are provided for managing heat generation of the vehicle and/or engine. Heat generated by the vehicle and/or engine, or one or more systems of such vehicle and/or engine, may be used to heat fuel consumed by the vehicle and/or engine, as burning a higher temperature fuel can provide, e.g., greater propulsion efficiency for an aircraft. However, thermal management systems often have a mismatch between capacity and demand. For example, more fuel heating capacity may be generated during certain operating conditions or modes, such as aircraft takeoff, than is needed during those operating conditions, while less fuel heating capacity is generated during operating conditions having a higher or greater demand for heated fuel. Accordingly, improvements to vehicles such as aircraft, engines (including engines for vehicles), and power/thermal management systems that help overcome these issues and/or take advantage of potential opportunities, such as the thermal capacity of engine and/or vehicle fuel, would be useful.

BRIEF DESCRIPTION

Aspects and advantages of the invention will be set forth in part in the following description, or may be obvious from the description, or may be learned through practice of the invention.

In one exemplary embodiment of the present subject matter, a system is provided. The system comprises a heat source for providing a flow of a first hot fluid and a fuel flowpath for a flow of a fuel. The fuel flowpath includes a fuel accumulator and a first heat exchanger for heat transfer between the first hot fluid and the fuel. The first heat exchanger includes a first hot fluid inlet for receipt of the flow of the first hot fluid and a fuel inlet for receipt of the flow of the fuel. The first hot fluid has a first hot fluid inlet temperature at the first hot fluid inlet of the first heat exchanger and the fuel has a fuel inlet temperature at the fuel inlet of the first heat exchanger. The first hot fluid inlet temperature is greater than the fuel inlet temperature such that the fuel is heated through heat transfer with the first hot fluid in the first heat exchanger. The fuel accumulator is configured for accumulating at least a portion of the heated fuel.

In another exemplary embodiment of the present subject matter, a method of operating a system is provided. The method comprises selectively operating a thermal transport loop to transfer thermal energy between a heat source and an intermediate fuel loop to heat fuel flowing in the intermediate fuel loop. The method further comprises selectively operating the intermediate fuel loop to store the heated fuel in a fuel accumulator, wherein the thermal energy is transferred through a heat exchange system.

In yet another exemplary embodiment of the present subject matter, a method of operating a system of a gas turbine engine is provided. The method comprises operating a first fuel system and operating a second fuel system configured for receipt of a fuel from the first fuel system. The second fuel system includes a fuel accumulator. A heat source is in thermal communication with the fuel in the second fuel system, and heat from the heat source is transferred to the fuel in the second fuel system to heat the fuel. The heated fuel is accumulated in the fuel accumulator during a first operating mode of the gas turbine engine for use by the gas turbine engine during a second operating mode of the gas turbine engine.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1A is a top view of an aircraft vehicle in accordance with an exemplary embodiment of the present subject matter.

FIG. 1B is a side view of the exemplary aircraft vehicle of FIG. 1A.

FIG. 1C is a schematic, cross-sectional view of a gas turbine engine in accordance with an exemplary embodiment of the present subject matter.

FIGS. 2-7B are flow diagrams of a thermal management system in accordance with various exemplary embodiments of the present subject matter.

DETAILED DESCRIPTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

The word "exemplary" is used herein to mean "serving as an example, instance, or illustration." Any implementation described herein as "exemplary" is not necessarily to be construed as preferred or advantageous over other implementations.

As used herein, the terms "first," "second," and "third" may be used interchangeably to distinguish one component from another and are not intended to signify location or importance of the individual components.

The terms "forward" and "aft" refer to relative positions within a gas turbine engine or vehicle and refer to the normal operational fluid flow path of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a," "an," and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value, or the precision of the methods or machines for constructing or manufacturing the components and/or systems. The approximating language may refer to being within a +/−1, 2, 4, 10, 15, or 20 percent margin in either individual values, range(s) of values, and/or endpoints defining range(s) of values.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Referring now to the drawings, wherein identical numerals indicate the same elements throughout the figures, FIG. 1A provides a top view of an exemplary aircraft vehicle 10 as may incorporate various embodiments of the present subject matter. FIG. 1B provides a port side 24 view of the aircraft 10 as illustrated in FIG. 1A. As shown in FIGS. 1A and 1B collectively, the aircraft 10 defines a longitudinal direction L that extends therethrough, a vertical direction V, a transverse direction T, a forward end 14, and an aft end 16.

Moreover, the aircraft 10 includes a fuselage 20, extending longitudinally from the forward end 14 of the aircraft 10 towards the aft end 16 of the aircraft 10, and a pair of wings 22, or rather, a first wing 22A and a second wing 22B. The first wing 22A extends outwardly from the fuselage 20 generally along the transverse direction T with respect to the longitudinal direction L, from the port side 24 of the fuselage 20. Further, the second wing 22B similarly extends outwardly from the fuselage 20, generally along the transverse direction T with respect to the longitudinal direction L, from a starboard side 26 of the fuselage 20. Each of the wings 22A, 22B for the exemplary embodiment depicted includes one or more leading edge flaps 28 and one or more trailing edge flaps 30.

Referring still to the exemplary aircraft 10 of FIGS. 1A and 1B, the aircraft 10 further includes a vertical stabilizer 32 having a rudder flap 34 for yaw control, and a pair of horizontal stabilizers 36, each having an elevator flap 38 for pitch control. The fuselage 20 additionally includes an outer surface 40. However, it should be appreciated that in other exemplary embodiments of the present disclosure, the aircraft 10 may additionally or alternatively include any other suitable configuration of stabilizers that may or may not extend directly along the vertical direction V or horizontal/transverse direction T. In addition, alternative stabilizers may be any suitable shape, size, configuration, or orientation while remaining within the scope of the present subject matter.

The exemplary aircraft 10 of FIGS. 1A and 1B also includes a propulsion system. The exemplary propulsion system depicted includes a plurality of aircraft engines 22, at least one of which mounted to each of the pair of wings 22A, 22B. Specifically, the plurality of aircraft engines includes a first aircraft engine 42 mounted to the first wing 22A and a second aircraft engine 44 mounted to the second wing 22B. In at least certain exemplary embodiments, the aircraft engines 42, 44 may be configured as turbofan jet engines (see, e.g., FIG. 1C) suspended beneath the wings 22A, 22B in an under-wing configuration. Alternatively, however, in other exemplary embodiments any other suitable aircraft engine may be provided. For example, in other exemplary embodiments the first and/or second aircraft engines 42, 44 may be configured as turbojet engines, turboshaft engines, turboprop engines, etc. Further, in still other exemplary embodiments, the propulsion system may include one or more electric, or hybrid-electric, aircraft engines (e.g., electric fans).

Referring now to FIG. 1C, a schematic cross-sectional view is provided of a gas turbine engine in accordance with an exemplary embodiment of the present disclosure. More particularly, for the embodiment of FIG. 1C, the gas turbine engine is a high-bypass turbofan jet engine 200, referred to herein as "turbofan engine 200" or "engine 200." Notably, in at least certain embodiments, the aircraft engines 42, 44 of FIGS. 1A and 1B may be configured in substantially the same manner as exemplary turbofan engine 200 depicted in FIG. 1C, discussed below.

As shown in FIG. 1C, the turbofan engine 200 defines an axial direction A (extending parallel to a longitudinal centerline 201 provided for reference), a radial direction R, and a circumferential direction (extending about the axial direction A; not depicted in FIG. 1C). In general, the turbofan engine 200 includes a fan section 202 and a turbomachine 204 disposed downstream from the fan section 202.

The exemplary turbomachine 204 depicted generally includes a substantially tubular outer casing 206 that defines an annular inlet 208. The outer casing 206 encases, in serial flow relationship, a compressor section including a booster or low pressure (LP) compressor 210 and a high pressure (HP) compressor 212; a combustion section 214; a turbine section including a high pressure (HP) turbine 216 and a low pressure (LP) turbine 218; and a jet exhaust nozzle section 220. The compressor section, combustion section 214, and turbine section together define at least in part a core air flowpath 221 extending from the annular inlet 208 to the jet nozzle exhaust section 220. The turbofan engine 200 further includes one or more drive shafts. More specifically, the turbofan engine 200 includes a high pressure (HP) shaft or spool 222 drivingly connecting the HP turbine 216 to the HP compressor 212, and a low pressure (LP) shaft or spool 224 drivingly connecting the LP turbine 218 to the LP compressor 210.

For the depicted embodiment, fan section 202 includes a fan 226 having a plurality of fan blades 228 coupled to a disk 230 in a spaced apart manner. As depicted, the fan blades 228 extend outward from the disk 230 generally along the radial direction R. The fan blades 228 and disk 230 are together rotatable about the longitudinal axis 201 by LP shaft 224. In some embodiments, a power gear box having a plurality of gears may be included for stepping down the rotational speed of the LP shaft 224 to a more efficient rotational fan speed.

Referring still to the exemplary embodiment of FIG. 1C, the disk 230 is covered by rotatable front hub or nacelle 236 aerodynamically contoured to promote an airflow through the plurality of fan blades 228. Additionally, the exemplary fan section 202 includes an annular fan casing or outer nacelle 238 that circumferentially surrounds the fan 226 and/or at least a portion of the turbomachine 204. It should be appreciated that nacelle 236 may be configured to be supported relative to the turbomachine 204 by a plurality of circumferentially-spaced outlet guide vanes 240. Moreover, a downstream section 242 of the nacelle 238 may extend over an outer portion of the turbomachine 204 so as to define a bypass airflow passage 244 therebetween.

During operation of the turbofan engine 200, a volume of air 246 enters turbofan engine 200 through an associated inlet 248 of the nacelle 238 and/or fan section 202. As the volume of air 246 passes across fan blades 238, a first portion of the air 246 as indicated by arrows 250 is directed or routed into the bypass airflow passage 244 and a second portion of the air 246 as indicated by arrows 252 is directed or routed into the LP compressor 210. The ratio between the first portion of air 250 and the second portion of air 252 is commonly known as a bypass ratio. The pressure of the second portion of air 252 is then increased as it is routed through the high pressure (HP) compressor 212 and into the combustion section 214, where it is mixed with fuel and burned to provide combustion gases 254.

The combustion gases 254 are routed through the HP turbine 216 where a portion of thermal and/or kinetic energy from the combustion gases 254 is extracted via sequential stages of HP turbine stator vanes that are coupled to the outer casing 206 and HP turbine rotor blades that are coupled to the HP shaft or spool 222, thus causing the HP shaft or spool 222 to rotate, thereby supporting operation of the HP compressor 212. The combustion gases 254 are then routed through the LP turbine 218 where a second portion of thermal and kinetic energy is extracted from the combustion gases 254 via sequential stages of LP turbine stator vanes that are coupled to the outer casing 206 and LP turbine rotor blades that are coupled to the LP shaft or spool 224, thus causing the LP shaft or spool 224 to rotate, thereby supporting operation of the LP compressor 210 and/or rotation of the fan 226.

The combustion gases 254 are subsequently routed through the jet exhaust nozzle section 220 of the turbomachine 204 to provide propulsive thrust. Simultaneously, the pressure of the first portion of air 250 is substantially increased as the first portion of air 250 is routed through the bypass airflow passage 244 before it is exhausted from a fan nozzle exhaust section 256 of the turbofan engine 200, also providing propulsive thrust. The HP turbine 216, the LP turbine 218, and the jet exhaust nozzle section 220 at least partially define the core air flowpath 221 for routing the combustion gases 254 through the turbomachine 204.

As described above, the second portion of air 252 is mixed with fuel in the combustion section 214 to produce combustion gases 254. As shown schematically in FIG. 1C, the engine 200 may include a fuel delivery system 260 for providing fuel to the combustion section 214 of the engine 200. The fuel delivery system 260 may include a fuel tank 262 and one or more fuel delivery lines 264, which may form a fuel flowpath from the fuel source (fuel tank 262) to the combustion section 214. In other embodiments, however, that the fuel delivery system 260 may be considered part of a vehicle, such as aircraft 10, in which the engine 200 is installed, rather than as part of the engine 200. Further, it will be understood that, although not described herein, the exemplary aircraft 10 may include a fuel delivery system, such as fuel delivery system 260, for providing fuel to the engines 42, 44, which may or may not be configured as described with respect to engine 200.

It will be appreciated that the exemplary turbofan engine 200 depicted in FIG. 1C is provided by way of example only. In other exemplary embodiments, any other suitable engine may be utilized with aspects of the present disclosure. For example, in other embodiments, the engine may be any other suitable gas turbine engine, such as a turboshaft engine, turboprop engine, turbojet engine, etc. In such a manner, it will further be appreciated that in other embodiments the gas turbine engine may have any other suitable configuration, such as any other suitable number or arrangement of shafts, compressors, turbines, fans, etc. Moreover, although the exemplary gas turbine engine depicted in FIG. 1C is shown schematically as a direct drive, fixed-pitch turbofan engine 200, in other embodiments, a gas turbine engine of the present disclosure may be a geared gas turbine engine (i.e., including a gearbox between the fan 226 and shaft driving the fan, such as the LP shaft 224), may be a variable pitch gas turbine engine (i.e., including a fan 226 having a plurality of fan blades 228 rotatable about their respective pitch axes P), etc. Further, although not depicted herein, in other embodiments the gas turbine engine may be any other suitable type of gas turbine engine, such as an industrial gas turbine engine incorporated into a power generation system, a nautical gas turbine engine, etc. Further still, in alternative embodiments, aspects of the present disclosure may be incorporated into, or otherwise utilized with, any other type of engine, such as reciprocating engines.

Turning now to FIG. 2, the present subject matter also provides a thermal management system, such as may be used with the engine 200. More particularly, the thermal management system 100 (TMS 100 or system 100) may manage thermal transients of one or more systems and/or apparatus of the engine 200 and/or a vehicle 10 in which the engine 200 is installed. For example, to manage thermal transients, the system 100 may be used to heat fuel and store the heated fuel for use during certain operational modes by the engine 200 or a vehicle 10 including the engine 200.

As shown in FIG. 2, the system 100 generally may comprise a heat source 102 for providing a flow of a first hot fluid $H_1$ and a fuel flowpath 104 for a flow of a fuel F (i.e., a mass flow of fuel F). The fuel flowpath 104 includes a fuel accumulator 106 and a first heat exchanger 108 for heat transfer between the first hot fluid $H_1$ and the fuel F. The first heat exchanger 108 includes a first hot fluid inlet 110 for receipt of the flow of the first hot fluid $H_1$ and a fuel inlet 112 for receipt of the flow of the fuel F. The first hot fluid $H_1$ has a first hot fluid inlet temperature $T_{H1}$ at the first hot fluid inlet 110, and the fuel F has a fuel inlet temperature $T_{Fi}$ at the fuel inlet 112. In exemplary embodiments, the first hot fluid inlet temperature $T_{H1}$ is greater than the fuel inlet temperature $T_{Fi}$ such that the fuel F is heated through heat transfer with the first hot fluid $H_1$ in the first heat exchanger 108. As such, the first heat exchanger 108 also may be referred to as a fuel heater.

The fuel accumulator 106 is configured for accumulating at least a portion of the heated fuel F. That is, at least a portion of the fuel F heated in the first heat exchanger 108 may flow along the fuel flowpath 104 from the first heat exchanger 108 to the fuel accumulator 106, where the heated fuel F may be stored for use during certain operational modes of, e.g., the vehicle 10 and/or engine 200. The fuel accumulator 106 also may be referred to as a fuel tank that is operated as accumulator of heated fuel. Further, it will be appreciated that "heated fuel" may refer to fuel F that is at a higher temperature after heat exchange with a hot fluid, such as the first hot fluid $H_1$, than before heat exchange with the hot fluid. Moreover, as further described herein, the fuel F may be delivered to the fuel flowpath 104 from a fuel source, such as a main fuel tank of the vehicle 10 and/or engine 200, e.g., the fuel tank 262 illustrated in FIG. 1C. The heated fuel F may be at a higher or greater temperature than fuel F stored in the main fuel tank and/or delivered to the fuel flowpath 104 from the main fuel tank or other fuel source. In other embodiments, the fuel accumulator 106 may be the aircraft fuel tank, e.g., fuel tank 262. Thus, the system 100 may be independent of the aircraft main fuel tank, where the fuel accumulator 106 is an intermediate vessel between the aircraft main fuel tank and the engine (e.g., between main fuel tank 262 and the engine 200), or may include the aircraft main fuel tank. An intermediate fuel accumulator 106 could be smaller than the main aircraft fuel tank(s), resulting in quicker fuel heating times and/or lower total energy to raise a smaller amount of fuel F to the optimal burn temperature. Further, a separate hot fuel accumulator 106 allows the aircraft (e.g., vehicle 10) to switch back the unheated, main aircraft tank in fault conditions or other revisionary operating modes.

It will be appreciated that the term "heated fuel F" as used herein denotes fuel F that has been heated through heat exchange with the first hot fluid $H_1$. That is, the fuel inlet temperature $T_{Fi}$ is less than a fuel outlet temperature $T_{Fo}$. The fuel outlet temperature $T_{Fo}$ is the fuel temperature upon exit from the first heat exchanger 108, i.e., at a fuel outlet 115, after heat exchange with the first hot fluid $H_1$.

As depicted in the exemplary embodiment of FIG. 2, a remaining portion of the heated fuel F (i.e., the portion of the fuel F that does not flow to the fuel accumulator 106) may flow to a fuel burn location 114 that is downstream of the first heat exchanger 108; the fuel burn location 114 may be, e.g., a combustor or combustion section of an engine, such as the combustion section 214 of the engine 200. Accordingly, the fuel F may be heated through heat exchange with a hot fluid H before flowing to the fuel accumulator 106 (which may be referred to as fuel flow $F_{tank}$), where the heated fuel F is stored for later use, and/or before flowing to the fuel burn location 114 (which may be referred to as fuel flow $F_{burn}$), where the heated fuel F is available for consumption by the vehicle 10 and/or engine 200. That is, spare heating capacity $HC_{heat}$ generated by the heat source 102 may be accumulated in the fuel F stored in the fuel accumulator or tank 106 for later use, e.g., in response to increased fuel demands $D_{fuel}$. As such, the fuel loop 104 has a fuel system heating capacity $HC_{fuel}$, which may be understood as a measure of the maximum possible heat transfer rate of the fuel loop 104, e.g., at the first heat exchanger 108.

In various embodiments, the heat source 102 is an airflow at an elevated temperature, e.g., greater than a maximum fuel temperature, which may be the pyrolytic limit of the fuel F, and in exemplary embodiments, the maximum fuel temperature may be within a range of 600° F. to 1000° F. For example, the first hot fluid $H_1$ may be engine bleed air of a gas turbine engine, such as the engine 200. Referring to FIG. 3, in some embodiments, the system 100 comprises a power unit 116 including a turbine 118 and a generator 120, and the first hot fluid $H_1$ is discharged air from the turbine 118. It will be appreciated that the power unit 116 may be an auxiliary power unit that is used to generate power for specific systems, units, or the like of the vehicle 10 and/or engine 200. In such embodiments, the turbine 118 may receive a flow of combustion products 121, e.g., from a burner or the like. More particularly, the burner may receive engine bleed air and fuel, e.g., from a fuel source such as fuel tank 262, which mix and burn in the burner to form the combustion products 121. In still other embodiments, the first hot fluid $H_1$ may be discharge air from other engine and/or vehicle heat loads. For instance, the heat source 102 for an aircraft vehicle may be cooled cooling air, an environmental control system (ECS) pre-cooler, a waste heat recovery loop, etc.

As further illustrated in FIGS. 2 and 3, the system 100 also may comprise a fuel recirculation valve 122 disposed in the fuel flowpath 104. As shown in the figures, the fuel recirculation valve 122 may be disposed downstream of the first heat exchanger 108 and upstream of the fuel accumulator 106. The fuel recirculation valve 122 is configured to control a flow of the heated fuel F between the fuel accumulator 106 and the fuel burn location 114. More particularly, the fuel recirculation valve 122 may be used to modulate the flow of heated fuel F between the fuel accumulator 106 and the fuel burn location 114. As such, the fuel recirculation valve 122 may help control a burn flow temperature of the fuel F, which is described in greater detail below.

In some embodiments, the fuel flowpath 104 comprises a first heat exchanger bypass line 124 for bypassing the first heat exchanger 108. A first bypass valve 126 is disposed along the first heat exchanger bypass line 124 for controlling the flow of fuel F between the first heat exchanger 108 and the first heat exchanger bypass line 124. Thus, the flow of fuel F may be diverted to and/or away from the first heat exchanger 108, e.g., depending on the current fuel demand $D_{fuel}$ at the fuel burn location 114, the heating capacity $HC_{heat}$ of the first hot fluid $H_1$, etc. In some embodiments, the first bypass valve 126 may be closed such that all or substantially all of the fuel F flows through the first heat exchanger 108. In other embodiments, the first bypass valve 126 may be open such that all or substantially all of the fuel F is diverted to the first bypass line 124 and does not flow through the first heat exchanger 108. In still other embodiments, the first bypass valve 126 may be, e.g., partially open such that a portion of the fuel F flows through the first heat exchanger 108 and the remainder of the fuel F bypasses the first heat exchanger 108 and flows through the first bypass line 124 to be returned to the fuel flowpath 104 downstream of the first heat exchanger 108.

As further depicted in the figures, a fuel pump 128 may be disposed in the fuel flowpath 104 for driving the fuel F along the fuel flowpath 104. Although depicted downstream of the fuel accumulator 106, it will be appreciated that the fuel pump 128 may be disposed or positioned at any suitable location along the fuel flowpath 104 to urge the fuel F to flow along the fuel flowpath 104.

In some embodiments, the fuel F may be used to cool one or more thermal loads, which also may impart heat to the fuel F. More particularly, as described in greater detail herein, the fuel F may flow to the fuel flowpath 104 from a fuel tank, such as the fuel tank 262 of the engine fuel system 260, which may be referred to as a main fuel tank. One or more fuel-cooled loads, such as an engine lube oil system, may be disposed upstream of the fuel accumulator 106, such that the loads are cooled by the fuel F prior to the fuel F reaching the fuel accumulator. Alternatively, the fuel-cooled loads may be handled through a separate fuel return to accumulator 106 loop independent of the first heat exchanger or fuel heater 108.

As further shown in FIGS. 2 and 3, upon exit from the first heat exchanger 108, the first hot fluid $H_1$ may be used for cooling or other thermal management purposes at a downstream location 132. For instance, where the first hot fluid $H_1$ is air, such as engine bleed air or the like, the air may be cooler when it exits the first heat exchanger 108 than when it enters the first heat exchanger 108 at the first hot fluid inlet 110 due to heat exchange with the cooler fuel F. As such, the air may be used to cool one or more components of the apparatus in which the system 100 is installed, such as vehicle 10 and/or engine 200. As one example, the air discharged from the first heat exchanger 108 may be used for turbine cooling of the turbine portion 216, 218 of the engine 200. Where the air is engine bleed air, which may have been used for turbine cooling in the absence of the system 100, passing the engine bleed air through the system 100 may further cool the cooling air, i.e., may cool the engine bleed air before it is used for turbine cooling, which may increase the turbine cooling capacity of the air, etc. In other embodiments, the first hot fluid $H_1$ may be used in other ways upon exiting the first heat exchanger 108.

Referring now to FIG. 4, in some embodiments, the system 100 comprises a thermal transport flowpath 130, or a thermal transport bus loop, for a flow of a thermal transport fluid T therethrough. In such embodiments, the first heat exchanger 108 may be in fluid communication with the thermal transport flowpath 130 and the fuel flowpath 104, and the first hot fluid $H_1$ may be the thermal transport fluid T. Moreover, the system 100 further comprises a second heat exchanger 134, and the heat source 102 provides a flow of a second hot fluid $H_2$ to the second heat exchanger 134 for heat transfer between the second hot fluid $H_2$ and the thermal transport fluid T. That is, in the depicted embodiment of FIG. 4, the heat source 102 is in fluid communication with the second heat exchanger 134 rather than the first heat exchanger 108 as shown in FIGS. 2 and 3. Further, as illustrated in FIG. 4, the second heat exchanger 134 may be disposed in the thermal transport flowpath 130 upstream of the first heat exchanger 108.

As shown in the exemplary embodiment of FIG. 4, the second heat exchanger 134 includes a second hot fluid inlet 136 for receipt of the flow of the second hot fluid $H_2$ and a first thermal transport inlet 138 for receipt of the flow of the thermal transport fluid T. The second hot fluid $H_2$ has a second hot fluid inlet temperature $T_{H2}$ at the second hot fluid inlet 136, and the thermal transport fluid T has a first thermal transport inlet temperature $T_{T1}$ at the first thermal transport inlet 138. In exemplary embodiments, the second hot fluid inlet temperature $T_{H2}$ is greater than the first thermal transport inlet temperature $T_{T1}$ such that the thermal transport fluid T is heated through heat transfer with the second hot fluid $H_2$ in the second heat exchanger 134. Thus, the second heat exchanger 134 also may be referred to as a loop heater or bus heater.

Accordingly, rather than directly heating the fuel F with the fluid from the heat source 102, the exemplary system 100 illustrated in FIG. 4 utilizes the thermal transport fluid T to heat the fuel F, with the thermal transport fluid T being heated by the fluid from the heat source 102 having a heating capacity $HC_{heat}$ that may fluctuate, e.g., based on an operational condition of the engine 200, the vehicle 10, etc., and may be understood as a measure of the maximum possible heat transfer rate of the heat source 102 at a given time. Thus, the thermal transport flowpath 130, rather than the fuel flowpath 104, places a heating demand $D_{heat}$ on the heat source 102. Separating the fuel F from the hot fluid of the heat source 102 may be desirable, e.g., to increase the safety of the system 100 by reducing the risk of ignition of the fuel due to accidental exposure to air at an elevated temperature. More particularly, the thermal transport fluid T may be an inert working fluid, which may have reduced flammability, thereby reducing fire risks if exposed to either the hot fluid of the heat source 102 or the fuel F.

As further illustrated in FIG. 4, the fuel F may flow to the fuel loop 104 from a deoxygenated fuel source 150 (described in greater detail below), the main fuel tank 262, or other fuel source. A fuel heater valve 160 may be disposed along the flowpath from the fuel source 150/262, e.g., to control the flow of fuel F between the fuel flowpath 104, where the fuel F is heated as described herein, and the fuel burn location 114. For instance, the flow rate of the fuel F from the fuel source 150/262 may be modulated, using the valve 160, such that a higher flow rate $F_{burn}$ is sent to the fuel burn location 114 during periods of higher fuel demand $D_{fuel}$ at the fuel burn location 114. That is, the valve 160 may be a flow splitting or flow diverter valve, splitting or diverting the flow of fuel F between the fuel burn location 114 and the fuel flowpath 104 to ensure an adequate fuel supply, e.g., during a particular aircraft mission leg.

Referring still to FIG. 4, in some embodiments, the system 100 further comprises a third heat exchanger 140 for heat transfer between a cool fluid C and the thermal transport fluid T, e.g., to further cool the thermal transport fluid T. As shown in FIG. 4, the third heat exchanger 140 may be disposed in the thermal transport flowpath 130 downstream of the first heat exchanger 108. Moreover, the third heat exchanger 140 includes a cool fluid inlet 142 for receipt of the flow of the cool fluid C and a second thermal transport inlet 144 for receipt of the flow of the thermal transport fluid T. The cool fluid C has a cool fluid inlet temperature $T_C$ at the cool fluid inlet 142, and the thermal transport fluid T has a second thermal transport inlet temperature $T_{T2}$ at the second thermal transport inlet 144. In exemplary embodiments, the second thermal transport inlet temperature $T_{T2}$ is greater than the cool fluid inlet temperature $T_C$ such that the thermal transport fluid T is cooled through heat transfer with the cool fluid C in the third heat exchanger 140. Thus, the third heat exchanger 140 also may be referred to as a loop cooler or bus cooler.

Further, a transport pump 145 may be disposed in the thermal transport flowpath 130 for driving the thermal transport fluid T along the thermal transport flowpath 130. However, in some embodiments, the transport pump 145 may be omitted. Moreover, it will be appreciated that the location of the transport pump 145 as depicted in FIG. 4 is by way of example only and the transport pump 145 may be disposed at any suitable location along the thermal transport flowpath or loop 130.

As illustrated in FIG. 4, the thermal transport loop may be operated to reject heat to a cooling sink, at the first heat exchanger 108 and at the third heat exchanger 140. In some embodiments, the third heat exchanger 140 may be fan outlet guide vanes (OGV) or another fan stream heat exchanger of a gas turbine engine, such as engine 200. In other embodiments, the third heat exchanger 140 may be a vehicle system, e.g., a vehicle system of aircraft vehicle 10. For example, the vehicle system may be an auxiliary power unit, and residual energy from the thermal transport fluid T downstream of the first heat exchanger 108 (which also may be referred to as the fuel-loop heat exchanger) is used to preheat air into the auxiliary power unit. In still other embodiments, the third heat exchanger 140 may be used as part of a waste heat recovery loop, e.g., of the vehicle 10 and/or engine 200.

Similar to the first heat exchanger 108, the third heat exchanger 140 may be bypassed, e.g., to forego cooling of the thermal transport fluid T during certain operational modes. As shown in FIG. 4, the thermal transport flowpath 130 may comprise a third heat exchanger bypass line 146 for bypassing the third heat exchanger 140 and a third bypass valve 148 disposed along the third heat exchanger bypass line 146. The third bypass valve 148 modulates the flow of the thermal transport fluid T between the third heat exchanger 140 and the third bypass line 146. Thus, in some operating conditions, the third bypass valve 148 may be closed such that all or substantially all of the thermal transport fluid T flows through the third heat exchanger 140. In other operating conditions, the third bypass valve 148 may be open such that all or substantially all of the thermal transport fluid T is diverted to the third bypass line 146 and does not flow through the third heat exchanger 140. In still other operating conditions, the third bypass valve 148 may be, e.g., partially open such that a portion of the thermal transport fluid T flows through the third heat exchanger 140 and the remainder of the thermal transport fluid T bypasses the third heat exchanger 140 and flows through the third bypass line 146 to be returned to the thermal transport flowpath 130 downstream of the third heat exchanger 140.

Further, the first heat exchanger 108 and/or the third heat exchanger 140 may be regenerative heat exchangers (RHX) to store additional thermal energy. More particularly, the heat exchanger 108 and/or 140 may comprise additional thermal mass in the form of solid metallic or phase-change substances that are able to store thermal energy at certain system operating conditions and then release the stored thermal energy at other system operating conditions. In some embodiments, one or more valves may be closed to isolate the fuel F in the RHX 108 and/or 140, i.e., such that the fuel F is not flowing through the heat exchanger, while continuing to heat the fuel F by flowing the thermal transport fluid T through the thermal transport loop. Exemplary embodiments of such fuel isolation are illustrated in FIGS. 7A and 7B, where the first heat exchanger 108 and the fuel accumulator 106 are the same physical component.

Moreover, in some embodiments of the system 100 illustrated in FIG. 4, the third heat exchanger 140 may be omitted, e.g., the third heat exchanger 140 may not be needed to cool the thermal transport fluid T. More specifically, the thermal transport fluid T may be recirculated until the second hot fluid inlet 138 of the second heat exchanger 134 approaches a desired fuel temperature for fuel F delivered to the fuel burn location 114. The desired fuel temperature may be a fuel manifold target temperature $T_{FM}$, where the fuel burn location 114 includes a fuel manifold. Once the desired fuel temperature, e.g., the fuel manifold target temperature $T_{FM}$, is reached or nearly reached, recirculation of the thermal transport fluid T may be stopped, and the fuel F may flow to the fuel burn location 114 at or near the desired fuel temperature and/or may be stored in the fuel accumulator 106 for later use at the fuel burn location 114.

It will be appreciated that the third heat exchanger 140 may be any thermal transport fluid cooler or bus cooler. The third heat exchanger 140 also may be used to supply heat input to a fuel oxygen reduction unit. As used herein, the term "fuel oxygen reduction unit" generally means a device capable of reducing a free oxygen content of the fuel, such as a fuel deoxygenation unit, a fuel oxygen conversion unit, etc. More particularly, as described herein, fuel for a gas turbine engine and/or vehicle such as an aircraft may be an efficient heat sink to receive at least some of the heat generated during operation of the engine and/or vehicle, due at least in part to the fuel's heat capacity and an increased efficiency in engine power operation by heating the fuel to provide additional thermal energy to the thermodynamic cycle. However, heating the fuel up without properly conditioning the fuel may cause the fuel to "coke," or form solid particles that may clog up certain components of the fuel system, such as the fuel nozzles. Reducing an amount of oxygen in the fuel may effectively reduce the likelihood that the fuel will coke beyond an unacceptable amount. Thus, the engine and/or vehicle may include a fuel oxygen reduction unit for such a purpose. Use of a fuel oxygen reduction unit with the system 100 is described in greater detail below.

Referring now to FIGS. 5A and 5B, different operating modes of the system 100 are illustrated, which also may be described as methods of operating the system 100 for fuel regeneration or hot fuel scheduling. More particularly, the system 100 may have different configurations during different operating modes of the apparatus in which the system 100 is used, e.g., of the engine 200 and/or vehicle 10, to accumulate hot fuel and then dispense the hot fuel. For example, as shown in FIG. 5A, heat may be stored in the fuel F during a high-power takeoff mode or operating condition of the aircraft 10 (or engine 200 used in an aircraft). FIG. 5B illustrates use of the stored fuel F (i.e., hot fuel burn), which was heated during the high-power mode, during a low-power mode or operating condition, such as cruise. Thus, the benefits of hot fuel may be realized at low-power or cruise-type conditions using heat stored during high-power or take-off conditions. In some embodiments, fuel heating using the system 100 is directly coupled with vehicle and/or engine cooling circuit demand, e.g., turbine cooling circuit heat is dumped to the fuel F at power and is rejected back to burn flow at cruise.

As depicted in FIG. 5A, during the high-power mode where the heat source 102 may provide a significant flow of the second hot fluid $H_2$ (e.g., a high flow of engine bleed air at an elevated temperature as described above), the fuel F may continuously pass through the first heat exchanger 108 to be heated or warmed by heat exchange with the thermal transport fluid T (i.e., the first hot fluid $H_1$ in the depicted embodiment), which has been heated or warmed by heat exchange with the second hot fluid $H_2$. That is, the first bypass valve 126 may be fully closed or substantially closed to prevent the fuel F from bypassing the first heat exchanger 108 or to allow only a small portion of the fuel F to bypass the first heat exchanger 108. The fuel recirculation valve 122 may be fully open or substantially open such that the heated fuel F may flow from the first heat exchanger 108 to the fuel accumulator 106, e.g., for storage of the hot or heated fuel F or for recirculation through the fuel flowpath 104 to receive additional heating in the first heat exchanger 108.

As shown in FIG. 5B, during the low-power mode where the flow of the second hot fluid $H_2$ is diminished (e.g., where the flow of engine bleed air is reduced due to reduced engine power at cruise), the first bypass valve 126 may be fully open or substantially open and the fuel recirculation valve 122 may be fully closed or substantially closed. As such, substantially all of the fuel F flows from the fuel accumulator 106 to the fuel burn location 114, bypassing the first heat exchanger 108 and forgoing recirculation to the fuel accumulator 106. That is, either all of the fuel F flows to the fuel burn location 114 or only a relatively low flow (or small portion) of the fuel F recirculates through the fuel flowpath 104. Further, the third bypass valve 148 may be fully closed or substantially closed such that the thermal transport fluid T bypasses the third heat exchanger 140, thereby bypassing cooling of the thermal transport fluid T through heat exchange with the cool fluid C and minimizing any cooling of the fuel F via heat exchange with the thermal transport fluid T. Where the fuel F in the fuel accumulator 106 is heated fuel, e.g., from heat exchange with the thermal transport fluid T (i.e., the first hot fluid $H_1$ in the depicted embodiment) that had been heated by the second hot fluid $H_2$ during a high-power mode as illustrated in FIG. 5A, the heated fuel F may thereby flow from the fuel accumulator 106 to be consumed (i.e., burned) at the fuel burn location 114. As described herein, the elevated fuel temperature of the heated fuel F may provide benefits such as increased performance and efficiency of the engine and/or vehicle using the system 100.

Turning to FIG. 6, an exemplary system 100 utilizing deoxygenated fuel F, as well as fuel mixing, is illustrated. More particularly, the system 100 depicted in FIG. 6 utilizes mixing heated fuel F from the fuel flowpath 104 with non-heated, deoxygenated fuel F from a deoxygenated fuel source 150, e.g., to control the temperature of the fuel F that flows to the fuel burn location 114. Mixing fuel flows as described in greater detail below allows the fuel F in the fuel flowpath 104 to be heated above a fuel manifold target temperature $T_{FM}$ (if the fuel manifold target temperature $T_{FM}$ is below the pyrolytic limit of the fuel F), then cooled to the fuel manifold target temperature $T_{FM}$ by mixing with non-heated fuel F from a fuel source separate from or outside of the fuel flowpath 104. It will be appreciated that, in such embodiments, the fuel burn location 114 comprises a fuel manifold that is configured to receive fuel F at the fuel manifold target temperature $T_{FM}$. Further, thermal lag in the system 100 may prevent a fuel over-temperature condition resulting from engine chop. For instance, the fuel recirculation valve 122 may be fully open or substantially open to absorb residual heat in the regenerative fuel loop 104 from heat sources, such as heat source 102, with substantial fuel flow through the fuel loop 104. As another example, fuel mixing may be used during engine shut down, where reducing the fuel manifold target temperature $T_{FM}$ may be desired, e.g., to prevent residual fuel from coking or other flammability issues. It will be appreciated that, as used herein, "regenerative" denotes the ability or capacity of the fuel loop 104 to replenish its store of hot fuel during operation of the system and, more particularly, to replenish its accumulation of thermal energy in the fuel accumulator 106.

As shown in FIG. 6, the exemplary system 100 includes the deoxygenated fuel source 150, a first fuel line 152 from the deoxygenated fuel source 150 to the fuel flowpath 104, a second fuel line 154 from the deoxygenated fuel source 150 to a mixing location 156, and a third fuel line 158 from the fuel flowpath 104 to the mixing location 156. A fuel heater valve 160 is disposed along the first fuel line 152, e.g., to modulate the flow of fuel F from the fuel source 150 to the regenerative fuel heating loop or flowpath 104. As previously described, deoxygenated fuel F from the deoxygenated fuel source 150 is configured to mix with fuel F from the fuel accumulator 106 at the mixing location 156 to form a mixed fuel $F_M$. The mixed fuel $F_M$ is configured to flow from the mixing location 156 to the fuel burn location 114 for consumption of the mixed fuel $F_M$. Thus, the mixed fuel $F_M$ may have a temperature at or near the fuel manifold target temperature $T_{FM}$.

It will be appreciated that the difference between the deoxygenated fuel F, the fuel F in the fuel flowpath 104, and the mixed fuel $F_M$ is temperature. More particularly, as illustrated in FIG. 6, a portion of the deoxygenated fuel F flowing from the fuel source 150 flows to the fuel flowpath 104, where the deoxygenated fuel F may be heated through heat exchange with the thermal transport fluid T in the first heat exchanger 108. Thus, the fuel F exiting the first heat exchanger 108 may have a higher or greater temperature than the fuel F entering the fuel flowpath 104 from the fuel source 150 via the first fuel line 152 and flowing along the second fuel line 154 to the mixing location 156. The heated fuel F may be accumulated or stored in the fuel accumulator 106, e.g., to be directed to the fuel burn location 114 (via the mixing location) at a later time or during a different operation mode as described herein, or the heated fuel F may flow from the first heat exchanger 108 to the mixing location 156. As shown in FIG. 6, the heated fuel F mixes with the lower temperature fuel F from deoxygenated fuel source 150 at the mixing location 156, which may result in a flow of mixed fuel $F_M$ at or near the fuel manifold target temperature $T_{FM}$. For instance, the heated fuel F may have a temperature higher or greater than the fuel manifold target temperature $T_{FM}$, and the deoxygenated fuel F flowing from the fuel source 150 may have a temperature lower than the fuel manifold target temperature $T_{FM}$. As such, mixing the two fuel streams, with the resulting mixture $F_M$ flowing to the fuel burn location 114, may bring the fuel temperature closer to the fuel manifold target temperature $T_{FM}$ and, in exemplary embodiments, may result in a flow of fuel F having a temperature at or near the fuel manifold target temperature $T_{FM}$.

As depicted in FIG. 6, where the fuel F is a deoxygenated fuel, the system 100 may further comprise a source of inert gas 162 and an inert gas flowpath 164 extending from the inert gas source 162. The inert gas flowpath 164 is in fluid communication with the fuel accumulator 106 to provide inert gas ullage G to the fuel accumulator 106. More specifically, inert gas G is provided to the fuel accumulator 106 to prevent the fuel accumulator 106 from filling with air as the accumulator 106 empties, e.g., as heated fuel F flows from the fuel accumulator 106 during the low-power operating mode described with respect to FIG. 5B.

As previously described, the deoxygenated fuel F may be a product of a fuel oxygen reduction unit and may be used when it is desirable to burn fuel at an elevated temperature, e.g., to prevent coking of one or more fuel system components. A fuel oxygen reduction unit generally may include a contactor, a fuel gas separator, and a circulation gas flowpath extending from the fuel gas separator to the contactor. The fuel oxygen reduction unit generally may provide for a flow of stripping gas through the circulation gas flowpath during operation. It will be appreciated that the term "stripping gas" is used herein as a term of convenience to refer to a gas generally capable of performing the functions described herein. The stripping gas flowing through the stripping gas flowpath/circulation gas flowpath may be an actual stripping gas functioning to strip oxygen from the fuel within the contactor. Alternatively, the stripping gas flowing through the flowpath may be a sparging gas bubbled through a liquid fuel to reduce an oxygen content of such fuel. For example, the stripping gas may be an inert gas, such as nitrogen or carbon dioxide (CO2), an inert gas mixture, or some other gas or gas mixture having a relatively low oxygen content. Thus, in some embodiments, the inert gas source 162 also may function as a source of stripping gas.

Moreover, an exemplary fuel oxygen reduction unit may further include a gas boost pump, a gas oxygen reduction unit or catalyst, and a pre-heater. The catalyst may be positioned in the circulation gas flowpath for reducing an oxygen content of the flow of stripping gas through the circulation gas flowpath. The pre-heater may be positioned in thermal communication with the circulation gas flowpath upstream of the catalyst to increase oxygen reduction by the catalyst. In other embodiments, the pre-heater and the catalyst may be formed as a single unit, such that the unit heats the stripping gas to increase oxygen reduction by the unit.

The gas boost pump may be positioned in airflow communication with the circulation gas flowpath for increasing a pressure of the flow of stripping gas to the circulation gas flowpath. Of course, it will be appreciated that any suitable fuel oxygen reduction unit, having any appropriate configuration, may be used to generate or produce the deoxygenated fuel that flows from the deoxygenated fuel source 150. Further, it will be understood that the deoxygenated fuel source 150 need not be a fuel tank or the like; rather, the deoxygenated fuel source 150 may schematically represent the flow of deoxygenated fuel F from the fuel oxygen reduction unit.

The exemplary system 100 illustrated in FIG. 6 omits the third heat exchanger 140 and its bypass line 146 and bypass valve 148. However, in other embodiments, the third heat exchanger 140, third bypass line 146, and third bypass valve 148 may be included in the system 100 of FIG. 6. Further, for clarity, the inlet labels are omitted from the first and second heat exchangers 108, 134 in FIG. 6. It will be appreciated that the locations of the first hot fluid inlet 110, fuel inlet 112, second hot fluid inlet 136, and first thermal transport inlet 138 may be determined by reference to, e.g., FIG. 4.

Referring now to FIGS. 7A and 7B, in exemplary embodiments of the system 100, the fuel accumulator 106 and the first heat exchanger 108 are a single component. The combined fuel accumulator 106 and fuel-transport or first heat exchanger 108 may be referred to as an accumulator-exchanger 166. Thus, in some embodiments of the system 100, a large capacity bus-fuel heat exchanger 166 may be formed, where the tank for holding or accumulating the heated fuel (i.e., fuel accumulator 106) and the fuel heater (i.e., first heat exchanger 108) are the same component and the thermal transport bus flows through the fuel vessel.

As shown in the enlarged view of the accumulator-exchanger 166 included with FIG. 7A, the accumulator-exchanger 166 comprises a fuel inlet 168, a fuel outlet 170, a thermal transport inlet 172, and a thermal transport outlet 174. The fuel inlet 168 permits the fuel F to flow into the accumulator-exchanger 166, while the fuel outlet 170 is configured for the fuel F to flow from or out of the accumulator-exchanger 166. Similarly, the thermal transport inlet 172 permits the thermal transport fluid T to flow into the accumulator-exchanger 166, and the thermal transport outlet 174 is configured for the thermal transport fluid T to flow from or out of the accumulator-exchanger 166. Thus, the fuel F and thermal transport fluid T are in thermal communication within the accumulator-exchanger 166, such that heat may be exchanged between the thermal transport fluid T and the fuel F. Moreover, the accumulator-exchanger 166 comprises a sufficient volume for the heated fuel F to accumulate within the accumulator-exchanger 166. Further, for embodiments utilizing a deoxygenated fuel F, the accumulator-exchanger 166 also comprises an inert gas inlet 176 for the ingress of inert gas ullage into the accumulator-exchanger 166.

Downstream from the fuel outlet 170, a fuel mixing valve 165 is disposed in the fuel flowpath 104. As described herein, the heated fuel F flowing from the accumulator-exchanger 166 may be mixed with another fuel source, such as the deoxygenated fuel source 150 as illustrated in FIGS. 7A and 7B, to adjust the fuel manifold target temperature $T_1$ of the fuel F flowing to the fuel burn location 114. That is, the fuel mixing valve 165 may be modulated between closed, partially open, or fully open positions to help control the temperature of the fuel F delivered to the fuel burn location 114. Additionally, the fuel mixing valve 165 may be closed to isolate the heated fuel F in the accumulator-exchanger 166, e.g., such that the isolated volume of fuel F may be heated through heat exchange with the thermal transport fluid T, while fuel F may be delivered to the fuel burn location 114 from the deoxygenated fuel source 150. Further, an accumulator-exchanger bypass line 180 extends from a first location along the fuel flowpath 104 upstream of the accumulator-exchanger 166 to a second location downstream of the fuel mixing valve 165. As described herein, the fuel mixing valve 165 and the accumulator-exchange bypass line 180 are configured to allow mixing of the heated fuel F from the accumulator-exchanger 166 and fuel F from the fuel source 150 to control a temperature of the fuel F delivered to the fuel burn location 114.

Referring particularly to FIG. 7B, in some embodiments of the system 100 having the combined accumulator-exchanger 166, a recirculation option may be provided. More particularly, the exemplary embodiment of the system 100 illustrated in FIG. 7A may provide only a single storage option, where the fuel F is either stored in the accumulator-exchanger 166 or allowed to flow to the fuel burn location 114; the fuel F does not recirculate to pass back through the accumulator-exchanger 166. In contrast, the exemplary system 100 of FIG. 7B includes a fuel recirculation line 178. Thus, when the fuel mixing valve 165 is closed, the fuel F may accumulate in the accumulator-exchanger 166 and be heated by the thermal transport fluid T; the fuel pump 128 may be disposed in the fuel recirculation line 178 to help drive recirculation of the fuel F for heating by the transport bus T. When both the fuel heater valve 160 and the fuel mixing valve 165 are closed, an isolated volume of fuel F may be formed, which may allow additional heating of the fuel F. As further shown in FIG. 7B, when both valves 160, 165 are closed, a flow of the fuel F may still be provided from the deoxygenated fuel source 150 to the fuel burn location 114. However, it will be appreciated that, because the fuel F flowing directly from the deoxygenation fuel source 150 to the fuel burn location 114 has not passed through the accumulator-exchanger 166, such fuel flow is not heated to a temperature at or near the desired fuel manifold target temperature $T_{FM}$.

Additionally, like the embodiment illustrated in FIG. 6, the exemplary system 100 shown in FIGS. 7A and 7B omits the third heat exchanger 140 and its bypass line 146 and bypass valve 148. However, in other embodiments, the third heat exchanger 140, third bypass line 146, and third bypass valve 148 may be included in the system 100 of FIG. 7A and/or the system 100 of FIG. 7B.

It will be appreciated that the foregoing descriptions of the system 100 also may be understood as describing one or more methods of operating the system 100, e.g., for storing and/or accumulating heat in fuel of a vehicle. Generally, the methods of operating the system 100 include operating a first fuel system, e.g., the fuel deoxygenation system that supplies a deoxygenated fuel source 150, and operating a second fuel system, e.g., the fuel flowpath 104 including the fuel accumulator 106. A heat source 102 is in thermal communication with a fuel F in the second fuel system 104 such that heat from the heat source 102 is transferred to the fuel F in the second fuel system 104, thereby heating the fuel F. The method further comprises accumulating the heated fuel in the fuel accumulator 106 for selective use, e.g., by a gas turbine engine and/or vehicle (such as engine 200 and/or aircraft vehicle 10). More particularly, the second fuel system 104 is regeneratively operated so as to store heat from the heat source 102 in the second fuel system 104 during some operating conditions and to use the heated fuel F in the regenerative loop 104 to increase a temperature of the fuel F supplied to, e.g., a gas turbine engine, in other operating conditions.

As a specific example, referring to FIGS. 4, 5A, and 5B, an exemplary method of operating the system 100 may include selectively operating a thermal transport flowpath or loop 130 to transfer thermal energy between a heat source 102 and an intermediate fuel flowpath or loop 104 through a heat exchange system, e.g., first and second heat exchangers 108, 134. More particularly, the thermal transport flowpath 130 thermally connects the heat source 102 and the intermediate fuel flowpath 104, which may be a deoxygenated fuel loop between the main engine fuel tank 262 and engine combustor 214. The method further may comprise selectively operating the fuel flowpath or loop 104 to store heated fuel F in a fuel accumulator 106. That is, due to the transfer of thermal energy between the thermal transport fluid T flowing through the thermal transport flowpath 130 and the fuel F flowing through the fuel flowpath 104, the fuel F may be heated to a temperature greater than the temperature of the fuel F from, e.g., the main fuel tank 262. The fuel flowpath 104 includes the fuel accumulator 106 for accumulating or storing the heated fuel F. For instance, the fuel flowpath 104 may be an intermediate deoxygenated fuel loop selectively operated store heated deoxygenated fuel F in the fuel accumulator 106.

As described with respect to FIGS. 5A and 5B, the method also may comprise selectively operating the system 100 to control the flow of the heated fuel F to the fuel burn location 114 (e.g., a fuel manifold of the engine 200) based on a demand signal and recirculating any remaining amount of fuel F through the fuel accumulator 106 and the first heat exchanger 108 (which also may be referred to as the fuel-bus heat exchanger or fuel heater). More specifically, during certain operational modes or operating conditions, such as a high-power mode of an engine and/or vehicle as described with respect to FIG. 5A, the heated fuel F exiting the first heat exchanger 108 may primarily be recirculated to the fuel accumulator 106, where a first portion of the heated fuel F may be stored and a second portion recirculated through the first heat exchanger 108. It will be appreciated that fully opening or substantially opening the fuel recirculation valve 122 permits recirculation through the fuel flowpath 104, thereby allowing accumulation of the heated fuel F in the fuel accumulator 106 and further heating of the fuel F in the first heat exchanger 108. However, in some embodiments, the first bypass valve 126 may be open (fully open, substantially open, or partially open) to avoid, partially or fully, further heating of the fuel F. Moreover, in some embodiments, a third portion of the heated fuel F may flow to the fuel burn location 114; in other embodiments, the fuel loop 104 may be closed such that substantially all of the heated fuel F is accumulated in the fuel accumulator 106 or recirculated through the first heat exchanger 108. In such embodiments, fuel may be supplied to the fuel burn location 114 directly from the main fuel tank (e.g., fuel tank 262) or an intermediate fuel system other than the fuel flowpath 104 (e.g., a fuel oxygen reduction unit). The system 100 may be operated in such a recirculation mode during the high-power condition to utilize excess heating capacity $HC_{heat}$ from the heat source 102 to heat the fuel F and to store the heated fuel F for use when the fuel heating capacity is reduced or diminished.

Further, during other operational modes or operating conditions, such as a low-power mode of the engine and/or vehicle as described with respect to FIG. 5B, the heated fuel F exiting the first heat exchanger 108 may primarily flow to the fuel burn location 114. For example, a first portion of the heated fuel F, comprising the majority of the heated fuel F, may flow to the fuel burn location 114 (e.g., to be burned in the engine combustor), and a second portion of the heated fuel F, comprising the remaining heated fuel F, may be recirculated through the fuel flowpath 104. In some embodiments, substantially all of the heated fuel F may be directed to the fuel burn location 114, e.g., by fully closing or substantially closing the fuel recirculation valve 122. Thus, as described with respect to FIGS. 5A and 5B, components of the system 100, such as the fuel recirculation valve 122 and/or the first bypass valves 126, may be selectively operated to control the flow of the fuel F between the fuel accumulator 106 and the fuel burn location 114, e.g., based on fuel demand and/or the amount of heat from the heat source 102 available for heating the fuel F.

As further described with respect to FIGS. 4, 5A, and 5B, the method also may include selectively operating the thermal transport flowpath or loop 130 to reject heat to a cooling sink (e.g., a fan stream, vehicle system, etc.). Rejecting heat to the cooling sink, e.g., via the third heat exchanger 140, may help maintain a fluid temperature of the thermal transport fluid T in the thermal transport system. Maintaining the fluid temperature of the thermal transport fluid T at or near a predetermined value may help prevent exceeding the effective, stable, or operational temperature limits of the fuel F and/or ensure the fuel F is heated to or near a desired fuel temperature (e.g., the fuel manifold target temperature $T_{FM}$) for use at the fuel burn location 114. Moreover, rejecting heat from the thermal transport fluid T to a cooling sink may provide a thermal benefit to one or more other systems of an engine and/or vehicle in which the system 100 is used. For example, the heat rejected from the thermal transport fluid T may preheat air used in an auxiliary power unit, thereby increasing the efficiency of the auxiliary power unit. As another example, the thermal transport fluid T may reject heat to a waste heat recovery loop, which may utilize the waste heat to increase efficiency in one or more other systems.

Although detailed above with respect to FIGS. 4, 5A, and 5B, it will be appreciated that a method of operating a system 100 may be understood with respect to each of various exemplary systems 100 described herein and illustrated in the figures. That is, the method may vary according to the various embodiments of the system 100 shown in FIGS. 2-7B, but a method of operation may be understood with respect to each of the various embodiments. Generally, each method of operating the respective system 100 may include regeneratively operating the fuel loop 104 to heat the fuel F therein during periods of extra heat generation (e.g., high-power modes of a gas turbine engine and/or aircraft) and to accumulate the heated fuel F in the fuel accumulator 106, e.g., to provide fuel at a desired elevated temperature during operating conditions when the heat source 102 cannot heat the fuel F to the desired elevated temperature.

As described herein, the fuel F that enters the system 100 does not return to its source; the fuel F that enters the fuel flowpath 104 either recirculates through the fuel flowpath 104 (including the fuel accumulator 106) or flows to the fuel burn location 114, e.g., for engine burn. Further, as shown, e.g., in FIG. 4, at least a portion of the fuel flow from the main fuel tank 262 or deoxygenated fuel source 150 into the system 100 may be diverted by the valve 125 to the fuel burn location 114, as fuel flow $F_{burn}$, without passing through the fuel loop 104. Thus, a total fuel flow $F_{total}$ of the system 100 is the sum of the fuel flow $F_{tank}$ to the fuel accumulator 106 and the fuel flow $F_{burn}$ to the fuel burn location 114, i.e., $F_{total} = F_{tank} + F_{burn}$. For fuel flows within the system 100, a fuel split between $F_{tank}$ and $F_{burn}$ may be a 1:1 ratio, a 2:1 ratio, or any other appropriate split of the total fuel flow $F_{total}$ between fuel flow $F_{tank}$ to the fuel accumulator 106 and the fuel flow $F_{burn}$ to the fuel burn location 114.

Moreover, as described herein, the fuel accumulator 106 is charged or accumulates fuel F when the heating capacity $HC_{heat}$ exceeds the heating demand $D_{heat}$. That is, the fuel flow $F_{tank}$ to the fuel accumulator 106 is greater than zero (0) when the heating capacity $HC_{heat}$ exceeds the heating demand $D_{heat}$ such that $F_{tank} > 0$ when $HC_{heat} > D_{heat}$. Further, charging the fuel accumulator 106 means more fuel F is going to the fuel accumulator 106 than to the fuel burn location 114, i.e., the ratio of the fuel flow $F_{tank}$ to the fuel flow $F_{burn}$ is greater than one (1) when the heating capacity $HC_{heat}$ exceeds the heating demand $D_{heat}$, or $F_{tank}/F_{burn} > 1$ when $HC_{heat} > D_{heat}$. Conversely, the fuel accumulator 106 is discharged, or heated fuel F flows from the fuel accumulator 106, when the heated fuel demand $D_{fuel}$ exceeds the fuel heating or thermal capacity $HC_{fuel}$. That is, the fuel flow $F_{tank}$ is less than zero (0), representing the fuel flow from the fuel accumulator 106, when the heated fuel demand $D_{fuel}$ is greater than the fuel thermal capacity $HC_{fuel}$ such that $F_{tank} < 0$ when $HC_{fuel} < D_{fuel}$. Additionally, discharging the fuel accumulator 106 means more than half or 50% of the fuel flow $F_{burn}$ is flowing from the fuel accumulator 106, i.e., the ratio of the fuel flow $F_{tank}$ to the fuel flow $F_{burn}$ is less than −50% (negative fifty percent, where the negative value indicates fuel flow from or out of the fuel accumulator 106) when the heated fuel demand $D_{fuel}$ exceeds the fuel thermal capacity $HC_{fuel}$, or $F_{tank}/F_{burn} > -0.50$ when $D_{fuel} > HC_{fuel}$. As described herein, one or more valves, such as valves 122, 125, 126 may be modulated to control the flow of the fuel F to the fuel accumulator 106 and the fuel burn location 114. Thus, one or more valves, e.g., valves 122, 125, 126, may be positioned to control the fuel flow F such that $F_{tank}/F_{burn} > 1$ when $HC_{heat} > D_{heat}$ and may be positioned to control the fuel flow F such that $F_{tank}/F_{burn} > -0.50$ when $D_{fuel} > HC_{fuel}$.

As further described herein, a heating demand $D_{heat}$ on the thermal transport bus loop 130 is independent of a heated fuel demand $D_{fuel}$ on the fuel loop 104, i.e., the heating demand $D_{heat}$ is for a flow of hot fluid $H_2$ to heat the thermal transport fluid T while the heated fuel demand $D_{fuel}$ is for a flow of heated fuel $F_{burn}$ to the fuel burn location 114, e.g., for combustion in the engine 200. However, the thermal or heating capacity $HC_{heat}$ of the hot fluid $H_2$ may not be independent from the thermal or heating capacity $HC_{fuel}$ of the fuel loop 104, e.g., because the engine 200 (which burns the fuel F) is also the powerplant for the vehicle 10 and provides energy or mass flow input to the heat source 102, which heats the thermal transport fluid T flowing in the thermal transport bus loop 130. Moreover, the fuel heating or thermal capacity $HC_{fuel}$ depends on the fuel flow $F_{burn}$ to the fuel burn location 114 (e.g., a burn flow rate of the fuel F) and the fuel supply temperature.

In at least some embodiments of the system 100 depicted in the figures, a valve, and in some instances additional fluid conduit, is included to bypass each heat exchanger and/or other components of the system 100. However, it will be appreciated that, in some embodiments, minimizing valves and/or conduits may be desirable. For example, a reduced number of valves and/or conduits may reduce the complexity, weight, etc. of the system 100. Reduced system complexity may offer manufacturing, installation, and service advantages (such as decreased time and cost of manufacturing, installation, and/or servicing, as well as requiring a smaller envelope for installation compared to more complex systems). Reduced weight may offer advantages such as increased engine efficiency, decreased fuel burn requirements, etc. Accordingly, for at least some embodiments, the numbers of valves and/or conduits may be optimized, e.g., such that a bypass line is not provided for every heat exchanger, but the respective fluids are allowed to flow through the respective heat exchanger. As one example, in some embodiments, the fuel heater or first heat exchanger bypass line 124 and its associated first bypass valve 126 may be omitted, with the fuel F instead always passing through the fuel heater or first heat exchanger 108.

Further, in some embodiments, the system 100 may include a control system 300, e.g., for opening and/or closing the one or more valves 122, 126, 148, 160, 165 that may be included in the respective configuration of the system 100 and/or for modulating a pump speed of the one or more pumps 128, 145 that may be included in the system 100. An exemplary control system 300 is illustrated in FIG. 2. It will be appreciated that any of the embodiments of the system 100 depicted in FIGS. 3-7B also may include the control system 300. Moreover, the valves 122, 126, 148, 160, 165 and/or pumps 128, 145 may be controlled in other ways as well. For example, in appropriate embodiments, one or more of the valves 122, 126, 148, 160, 165 may be passively actuated, e.g., by a temperature and/or pressure within the system 100 and/or external to the system 100. Thus, the one or more valves 122, 126, 148, 160, 165 of the system 100 may be referred to as an active system (e.g., controlled by the control system 300 or other actuation system or component) or a passive system (e.g., passively actuated as described) for controlling fluid flow (e.g., the flow of the thermal transport fluid T and/or the flow of the fuel F) in the system 100.

As shown in FIG. 2, the exemplary control system 300 includes a controller 302, with the controller 302 being operably connected to each of the valves 122, 126, as well as the pump 128. Specifically, the controller 302 generally includes a network interface 304. The network interface 304 may be operable with any suitable wired or wireless communications network for communicating data with other components of, e.g., the system 100, the engine 200, and/or other components or systems not depicted. As is illustrated using phantom lines, for the exemplary embodiment of FIG. 2, the network interface 304 utilizes a wireless communication network 306 to communicate data with other components. More particularly, through the network interface 304 of the controller 302 and the wireless communication network 306, the controller 302 may be operably coupled to each of the one or more valves 122, 126, 148, 160, 165 and/or pumps 128, 145 included in the particular embodiment of the system 100. It will be appreciated, of course, that although the network interface 304 utilizes the wireless communication network 306 for the exemplary embodiment of FIG. 2, in other embodiments, the network interface 304 may instead utilize a wired communication network or a combination of wired and wireless communication networks.

Referring still to FIG. 2, the controller 302 further includes one or more processors 308 and memory 310. The memory 310 stores data 312 and instructions 314 accessible by the one or more processors 308. The one or more processor(s) 208 can include any suitable processing device, such as a microprocessor, microcontroller, integrated circuit, logic device, and/or other suitable processing device. The one or more memory device(s) 310 can include one or more computer-readable media, including, but not limited to, non-transitory computer-readable media, RAM, ROM, hard drives, flash drives, and/or other memory devices. The instructions 314, when executed by the one or more processors 308, cause the control system 300 to perform functions. The instructions 314 within the memory 310 can be any set of instructions that, when executed by the one or more processors 308, cause the one or more processors 308 to perform operations, such as one or more of the operations described herein. In certain exemplary embodiments, the instructions 314 within the memory 310 can be software written in any suitable programming language or can be implemented in hardware. Additionally and/or alternatively, the instructions can be executed in logically and/or virtually separate threads on processors 308. The memory devices 310 can further store other data 314 that can be accessed by the processors 308.

In such a manner, it will be appreciated that in at least certain exemplary embodiments, the controller 302 may be configured to receive data from one or more sensors and/or components and may control operations of the system 100 in response to the data received from the one or more sensors and/or components. For example, the exemplary controller 302 may be configured to operate the first bypass valve 126 in response to data received from a flow sensor or temperature sensor (e.g., increase a flow of the heated fuel F to the fuel burn location 114 in response to receiving data indicative of a decreased flow of the first hot fluid $H_1$ or of a decrease in fuel temperature below the fuel manifold target temperature $T_{FM}$). Additionally and/or alternatively, the exemplary controller 302 may be configured to operate the fuel recirculation valve 122 in response to receiving data indicative of an operating condition or mode in which heated fuel F should be accumulated or stored in the fuel accumulator 106 rather than directed to the fuel burn location 114. The controller 302 may use other data to control the one or more valves and/or one or more pumps of the particular configuration of the system 100, with various exemplary configurations of the system 100 illustrated in FIGS. 2-7B.

In some embodiments, the control system 300 and/or the controller 302 may be part of automated digital controls (e.g., a Full Authority Digital Engine Control (FADEC) on an aircraft) that control one or more aspects of an engine, such as engine 200. For example, the controller 302 may be, e.g., an Electronic Engine Controller (EEC) or Electronic Control Unit (ECU) of a FADEC, and in addition to the functions described herein, may control fuel flow, engine geometries, and other parameters to optimize performance of the engine 200 during operation, such as during takeoff, flight, and landing for an aircraft. Various parameters, such as the state of flight, state of aircraft systems, and pilot commands, may be communicated using digital signals from a system, such as an avionics system, to the controller 302. As described herein, the controller 302 may include various components for performing various operations and functions, such as the one or more processors 308 and one or more memory devices 310. In other embodiments, the controller 302 may perform the specific functions described herein, and one or more other controllers may control various parameters to optimize performance of the engine 200 other than those specific functions. Thus, the control system 300 (e.g., an aircraft controller, FADEC, or the like) may control the storage or depletion of thermal energy in the system 100 by controlling the accumulation and distribution of heated fuel F as described herein.

It will be appreciated that the fuel F may be any suitable or appropriate fuel, e.g., for use in the engine 200 and/or vehicle 10. For example, in some embodiments, the fuel may be jet fuel or jet propellant (JP). In further embodiments, the fuel may be cryogenic or near-cryogenic, e.g., when the engine 100 is a hypersonic propulsion engine and/or the vehicle 200 is a hypersonic vehicle.

Further, the thermal transport fluid T may be any suitable working fluid for use in the thermal transport flowpath or loop 130. In some embodiments, the thermal transport fluid T used in the system 100 may depend on the fuel F, e.g., a certain thermal transport fluid T may be selected for use in the thermal transport loop 130 due to the fuel F with which the fluid T exchanges heat in the first heat exchanger 108. Generally, the thermal transport fluid T (when the system 100 includes the thermal transport flowpath or loop 130) may be an inert fluid, e.g., to enable a layer of redundancy in the system 100, protecting against a volatile mix of the fuel F and working fluid T flowing in the thermal transport flowpath 130. Example working fluids T may include, but are not limited to, the following: thermal oils; supercritical fluids such as supercritical carbon dioxide ($sCO_2$); liquid metals; standard industry refrigerants (R-### ANSI/ASHRAE designation), e.g., R-410a; and noble gases, which also carry refrigerant designations. As an example, where the fuel F is liquid hydrogen fuel (LH2 or the refrigerant designation R-702), the thermal transport fluid T may be helium (R-704) or neon (R-720) and, more particularly, may be supercritical helium, subcooled liquid neon, transcritical neon, or supercritical neon. As another example, where the fuel F is methane (R-50), the thermal transport fluid T may be nitrogen (R-728), argon (R-740), or krypton (R-784). More particularly, the working fluid T in the thermal transport flowpath 130 may be transcritical or supercritical nitrogen, transcritical or supercritical argon, or subcooled liquid krypton, transcritical krypton, or supercritical krypton. As yet another example, where the fuel F is jet fuel or jet propellant (JP), the thermal transport fluid T may be pentafluoroethane (R-410a) fire extinguishing media, a near azeotropic mixture of difluoromethance (R-32) and pentafluoroethane (R-125), carbon dioxide (CO2 or R-744), or a binary gas compound, such as xenon plus another gas. More particularly, the thermal transport fluid T may be supercritical pentafluoroethane or supercritical carbon dioxide ($sCO_2$). Further, a fire-suppressing working fluid T, such as supercritical carbon dioxide, may be selected for fuel inerting or for otherwise suppressing a fire in the event of a leak or other failure in which the fuel F and working fluid T could come into contact or mix together. Other working or thermal transport fluids T for use in the thermal transport loop or flowpath 130 may be used as well.

Moreover, it will be appreciated that, although described with respect to the vehicle 10 and gas turbine engine 200, the thermal management system 100 described herein may have other applications. That is, the system 100 is not limited to use with a gas turbine engine and/or a vehicle such as an aircraft. For example, in some embodiments, the system 100 may be incorporated into any other suitable aeronautical propulsion system, such as a hypersonic propulsion system, a turbofan engine, a turboshaft engine, a turboprop engine, a turbojet engine, a ramjet engine, a scramjet engine, etc., or combinations thereof, such as combined-cycle propulsion systems. Further, in certain embodiments, the system 100 may be incorporated into a non-aeronautical propulsion system, such as a land-based power-generating propulsion system, an aero-derivative propulsion system, etc. Further still, in certain embodiments, the system 100 may be incorporated into any other suitable propulsion system or vehicle, such as a manned or unmanned aircraft, etc.

Accordingly, the present subject matter provides systems and methods of heating fuel during periods of relatively high fuel heating capacity and storing the heated fuel for use during periods of relatively low fuel heating capacity. Further, through thermal transfer between a hot fluid, i.e., the fluid providing the heating capacity, and the fuel, the systems and methods described herein also may provide a cooling benefit by cooling the hot fluid, which may then be used for cooling one or more other systems or components. For example, where the hot fluid is engine bleed air for turbine cooling, the systems and methods described herein may provide a cooled cooling air benefit, as a result of heating the fuel to provide heated fuel for consumption by the engine.

More particularly, the systems and methods described herein provide a fuel heating system that regeneratively stores heat, e.g., engine and/or vehicle heat, in fuel stored in a fuel accumulator or tank of the fuel system (which may be an intermediate fuel tank of the engine and/or vehicle) such that the heat stored in the fuel can be discharged back to a burn flow, e.g., to optimize a hot or heated fuel specific fuel consumption (SFC) benefit. That is, the systems and methods described herein may provide a hot fuel benefit at low-power or cruise-type conditions using heat stored during high-power or take-off-type conditions. For example, a typical aircraft mission seeks to optimize fuel burn at lower power (e.g., cruise), but the aircraft engine heat rejection is highest at power (e.g., take off) such that there is a continual mismatch between fuel heating potential and hot fuel demand. Heated fuel regeneration as described herein provides a solution to the mismatch, as heated fuel may be stored in, e.g., an intermediate tank local to the engine and/or thermal management system (TMS) instead of fuel return to tank (e.g., the main fuel tank). Further, the systems and methods herein may be advantageous compared to typical thermal energy storage media, such as wax, liquid metals, and fusible alloys, which do not have sufficient power density and/or are too corrosive or toxic. Utilizing the fuel as a regenerative storage medium, as described herein, may overcome both these problems, providing a thermal energy storage medium that is sufficiently power dense as well as a less corrosive and toxic.

Further, known Brayton cycle thermal loops attempt to sufficiently heat fuel to a desired fuel temperature using multiple bleed air coolers and core flow path waste heat recovery to heat a thermal transport bus for heat transfer with the fuel. In contrast, the systems and methods described herein may eliminate heat exchange systems that only operate over specific aircraft mission legs, as well as provide heated fuel when the bleed air cooler provides reduced cooling at lower power operating conditions. Moreover, the systems and methods described herein may provide additional thermal lag that can aid fuel dynamics, e.g., by preventing a small or reduced fuel flow from overheating during engine chop. In addition, the systems and methods described herein may be implemented with a thermal transport bus or without; for example, direct fuel-air heat exchange is possible in embodiments of the systems and methods described herein. Still further, the present subject matter provides embodiments combining the hot fuel accumulator and fuel heater into a single component, which may simplify the thermal management system (e.g., requiring less space and/or fewer parts) and/or allow additional fuel heating as part of a closed system. Moreover, the air-transport (or air-bus) and transport-fuel (or bus-fuel) heat exchangers described herein may be regenerative heat exchangers that store additional thermal energy, increasing the capacity and/or efficiency of the exemplary systems. Other benefits and advantages of the systems described herein also may occur to those having ordinary skill in the art.

Further aspects of the invention are provided by the subject matter of the following clauses:

1. A system comprising a heat source for providing a flow of a first hot fluid and a fuel flowpath for a flow of a fuel, the fuel flowpath including a fuel accumulator and a first heat exchanger for heat transfer between the first hot fluid and the fuel, the first heat exchanger including a first hot fluid inlet for receipt of the flow of the first hot fluid and a fuel inlet for receipt of the flow of the fuel, wherein the first hot fluid has a first hot fluid inlet temperature at the first hot fluid inlet of the first heat exchanger and the fuel has a fuel inlet temperature at the fuel inlet of the first heat exchanger, wherein the first hot fluid inlet temperature is greater than the fuel inlet temperature such that the fuel is heated through heat transfer with the first hot fluid in the first heat exchanger, and wherein the fuel accumulator is configured for accumulating at least a portion of the heated fuel.
2. The system of any preceding clause, wherein the first hot fluid is engine bleed air of a gas turbine engine.
3. The system of any preceding clause, further comprising a fuel recirculation valve disposed in the fuel flowpath, the fuel recirculation valve disposed downstream of the first heat exchanger and upstream of the fuel accumulator, wherein the fuel recirculation valve is configured to control a flow of the heated fuel between the fuel accumulator and a fuel burn location.
4. The system of any preceding clause, wherein the fuel flowpath comprises a first heat exchanger bypass line for bypassing the first heat exchanger and a first bypass valve disposed along the first heat exchanger bypass line.
5. The system of claim 1, further comprising a thermal transport flowpath for a flow of a thermal transport fluid, wherein the first hot fluid is the thermal transport fluid.
6. The system of any preceding clause, wherein the heat source provides a flow of a second hot fluid, the system further comprising a second heat exchanger for heat transfer between the second hot fluid and the thermal transport fluid, the second heat exchanger including a second hot fluid inlet for receipt of the flow of the second hot fluid and a first thermal transport inlet for receipt of the flow of the thermal transport fluid, wherein the second hot fluid has a second hot fluid inlet temperature at the second hot fluid inlet of the second heat exchanger and the thermal transport fluid has a first thermal transport inlet temperature at the first thermal transport inlet of the second heat exchanger, wherein the second hot fluid inlet temperature is greater than the first thermal transport inlet temperature such that the thermal transport fluid is heated through heat transfer with the second hot fluid in the second heat exchanger, and wherein the first heat exchanger is in fluid communication with the thermal transport flowpath and the fuel flowpath and the second heat exchanger is disposed in the thermal transport flowpath upstream of the first heat exchanger.
7. The system of any preceding clause, further comprising a third heat exchanger for heat transfer between a cool fluid and the thermal transport fluid, the third heat exchanger including a cool fluid inlet for receipt of the flow of the cool fluid and a second thermal transport inlet for receipt of the flow of the thermal transport fluid, wherein the cool fluid has a cool fluid inlet temperature at the cool fluid inlet of the third heat exchanger and the thermal transport fluid has a second thermal transport inlet temperature at the second thermal transport inlet of the third heat exchanger, wherein the second thermal transport inlet temperature is greater than the cool fluid inlet temperature such that the thermal transport fluid is cooled through heat transfer with the cool fluid in the third heat exchanger, and wherein the third heat exchanger is disposed in the thermal transport flowpath downstream of the first heat exchanger.

8. The system of any preceding clause, wherein the thermal transport flowpath comprises a third heat exchanger bypass line for bypassing the third heat exchanger and a third bypass valve disposed along the third heat exchanger bypass line.

9. The system of any preceding clause, further comprising a fuel source; a first fuel line from the fuel source to the fuel flowpath; a second fuel line from the fuel source to a mixing location; and a third fuel line from the fuel flowpath to the mixing location, wherein fuel from the fuel source is configured to mix with fuel from the fuel accumulator at the mixing location to form a mixed fuel.

10. The system of any preceding clause, wherein the mixed fuel is configured to flow from the mixing location to a fuel burn location for consumption of the mixed fuel.

11. The system of any preceding clause, wherein the fuel accumulator and the second heat exchanger are a single component accumulator-exchanger, and wherein the single component accumulator-exchanger comprises a fuel inlet, a fuel outlet, a thermal transport inlet, and a thermal transport outlet.

12. The system of any preceding clause, further comprising a fuel mixing valve disposed along the fuel flowpath between the fuel outlet and a fuel burn location; a fuel source; and an accumulator-exchanger bypass line extending from a first location along the fuel flowpath upstream of the single component accumulator-exchanger to a second location downstream of the fuel mixing valve, wherein the fuel mixing valve and the accumulator-exchange bypass line are configured to allow mixing of the heated fuel from the single component accumulator-exchanger and fuel from the fuel source to control a temperature of the fuel delivered to the fuel burn location.

13. The system of any preceding clause, wherein a transport pump is disposed in the thermal transport flowpath for driving the thermal transport fluid along the thermal transport flowpath.

14. The system of any preceding clause, wherein a fuel pump is disposed in the fuel flowpath for driving the fuel along the fuel flowpath.

15. The system of any preceding clause, wherein the fuel is a deoxygenated fuel.

16. The system of any preceding clause, wherein the system further comprises a source of inert gas and an inert gas flowpath extending from the source of inert gas, and wherein the inert gas flowpath is in fluid communication with the fuel accumulator to provide inert gas ullage to the fuel accumulator.

17. The system of any preceding clause, further comprising a power unit including a turbine, wherein the first hot fluid is discharged air from the turbine.

18. A method of operating a system comprising selectively operating a thermal transport loop to transfer thermal energy between a heat source and an intermediate fuel loop to heat fuel flowing in the intermediate fuel loop; and selectively operating the intermediate fuel loop to store the heated fuel in a fuel accumulator, wherein the thermal energy is transferred through a heat exchange system.

19. The method of any preceding clause, wherein the heat exchange system comprises a first heat exchanger for thermal energy transfer between a thermal transport fluid flowing in the thermal transport loop and the fuel and a second heat exchanger for thermal energy transfer between a hot fluid and the thermal transport fluid.

20. The method of any preceding clause, further comprising selectively operating one or more valves to control a flow of the heated fuel between the fuel accumulator and a fuel burn location.

21. The method of any preceding clause, further comprising selectively operating the thermal transport loop to reject heat to a cooling sink.

22. The method of any preceding clause, further comprising modulating a bypass valve to control the flow of the thermal transport fluid through a heat exchanger to cool the thermal transport fluid.

23. The method of any preceding clause, further comprising selectively flowing a deoxygenated fuel from a deoxygenated fuel source to the intermediate fuel loop.

24. The method of any preceding clause, wherein selectively flowing the deoxygenated fuel comprises modulating a fuel heater valve disposed along a fuel line extending from the deoxygenated fuel source to the intermediate fuel loop.

25. The method of any preceding clause, further comprising selectively flowing fuel from the intermediate fuel loop and deoxygenated fuel from the deoxygenated fuel source to a fuel mixing location to produce a mixed fuel.

26. The method of any preceding clause, wherein the mixed fuel has a temperature at or near a fuel manifold target temperature.

27. The method of any preceding clause, wherein both the transfer of thermal energy and the storage of heated fuel occur in the fuel accumulator.

28. The method of any preceding clause, further comprising closing a fuel mixing valve and driving recirculation of the fuel through a fuel recirculation line to the fuel accumulator.

29. The method of any preceding clause, further comprising selectively operating one or more valves to control a flow of the heated fuel between a flow $F_{tank}$ of the fuel to the fuel accumulator and a flow $F_{burn}$ of the fuel to the fuel burn location, wherein the hot fluid has a heating capacity $HC_{heat}$ and the thermal transport loop has a heating demand $D_{heat}$, and wherein the flow of the fuel is controlled such that $F_{tank}/F_{burn} > 1$ when $HC_{heat} > D_{heat}$.

30. The method of any preceding clause, further comprising selectively operating one or more valves to control a flow of the heated fuel between a flow $F_{tank}$ of the fuel to the fuel accumulator and a flow $F_{burn}$ of the fuel to the fuel burn location, wherein the fuel has a heating capacity $HC_{fuel}$ and the fuel burn location has a heating demand $D_{fuel}$, and wherein the flow of the fuel is controlled such that $F_{tank}/F_{burn} < -0.50$ when $D_{fuel} > HC_{fuel}$.

31. A method of operating a system of a gas turbine engine, the method comprising operating a first fuel system and operating a second fuel system configured for receipt of a fuel from the first fuel system, the second fuel system including a fuel accumulator, wherein a heat source is in thermal communication with the fuel in the second fuel system, wherein heat from the heat source is transferred to the fuel in the second fuel system to heat the fuel, and wherein the heated fuel is accumulated in the fuel accumulator during a first operating mode of the gas turbine engine for use by the gas turbine engine during a second operating mode of the gas turbine engine.

32. The method of any preceding clause, wherein operating the second fuel system comprises selectively modulating a fuel recirculation valve to accumulate the heated fuel in the fuel accumulator during the first operating mode and to direct the heated fuel to a fuel burn location during the second operating mode.

33. The method of any preceding clause, wherein the heat source is discharged air from a power unit that includes a turbine and a generator.

34. The method of any preceding clause, wherein operating the second fuel system comprises passing both a hot fluid from the heat source and the fuel through a heat exchanger to heat the fuel.

35. The method of any preceding clause, wherein operating the second fuel system comprises modulating a bypass valve to bypass the heat exchanger with the fuel.

36. The method of any preceding clause, wherein the fuel accumulator and the heat exchanger are a single component accumulator-exchanger.

37. The method of any preceding clause, further comprising driving the fuel along a fuel flowpath using a fuel pump.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims or if they include equivalent structural elements with insubstantial differences from the literal language of the claims.

What is claimed is:

1. A system, comprising:
a heat source for providing a flow of a first hot fluid;
a first heat exchanger in thermal communication with the flow of the first hot fluid;
a fuel tank for providing a flow of fuel to a fuel flowpath;
a combustor fluidly coupled to the fuel tank via the fuel flowpath; and
a fuel accumulator fluidly coupled to the fuel tank and the combustor via the fuel flowpath, wherein the fuel accumulator is disposed along the fuel flowpath downstream from the fuel tank and upstream from the combustor, wherein the fuel flowpath passes through the first heat exchanger between the fuel accumulator and the combustor, wherein heat is transferred from the first hot fluid to the flow of fuel to provide a heated fuel, wherein the fuel flowpath is configured to route at least a portion of the heated fuel to the fuel accumulator, and wherein the fuel accumulator is configured to store the heated fuel, and wherein the fuel flowpath includes a bypass line that bypasses the accumulator and the first heat exchanger and is configured to route at least a portion of the flow of fuel directly from the fuel tank to the combustor, and wherein an exit of the bypass line merges with the fuel flowpath at a location upstream of the combustor.

2. The system of claim 1, further comprising:
a fuel recirculation valve disposed in the fuel flowpath, the fuel recirculation valve disposed downstream of the first heat exchanger and upstream of the fuel accumulator, wherein the fuel recirculation valve is configured to control a flow of the heated fuel between the fuel accumulator and the combustor.

3. The system of claim 1, wherein the fuel flowpath comprises a first heat exchanger bypass line for bypassing the first heat exchanger and a first bypass valve disposed along the first heat exchanger bypass line.

4. The system of claim 1, further comprising:
a thermal transport flowpath for a flow of a thermal transport fluid, wherein the first hot fluid is the thermal transport fluid.

5. The system of claim 4, wherein the heat source provides a flow of a second hot fluid to a second heat exchanger for heat transfer from the second hot fluid to the thermal transport fluid, wherein the first heat exchanger is in fluid communication with the thermal transport flowpath and in thermal communication with the fuel flowpath, and the second heat exchanger is disposed in the thermal transport flowpath upstream of the first heat exchanger.

6. The system of claim 5, further comprising:
a third heat exchanger in thermal communication with the thermal transport fluid for heat transfer between a cool fluid and the thermal transport fluid, wherein heat is transferred from the thermal transport fluid to the cool fluid, and wherein the third heat exchanger is disposed in the thermal transport flowpath downstream of the first heat exchanger.

7. The system of claim 6, wherein the thermal transport flowpath comprises a third heat exchanger bypass line for bypassing the third heat exchanger.

8. The system of claim 5, further comprising:
a fuel source comprising the fuel tank;
a first fuel line from the fuel source to the fuel flowpath;
a second fuel line from the fuel source to a mixing location; and
a third fuel line from the fuel flowpath to the mixing location,
wherein fuel from the fuel source is configured to mix with fuel from the fuel accumulator at the mixing location to form a mixed fuel.

9. The system of claim 8, wherein the mixed fuel is configured to flow from the mixing location to a fuel burn location for consumption of the mixed fuel.

10. The system of claim 4, wherein a transport pump is disposed in the thermal transport flowpath for driving the thermal transport fluid along the thermal transport flowpath.

11. The system of claim 1, wherein a fuel pump is disposed in the fuel flowpath for driving the fuel along the fuel flowpath.

12. The system of claim 1, wherein the fuel is a deoxygenated fuel, wherein the system further comprises a source of inert gas and an inert gas flowpath extending from the source of inert gas, and wherein the inert gas flowpath is in fluid communication with the fuel accumulator to provide inert gas ullage to the fuel accumulator.

13. A method of operating a system, comprising:
selectively operating a thermal transport loop to transfer thermal energy between a heat source and an intermediate fuel loop of a fuel flowpath via a first heat exchanger to heat fuel of a flow of fuel from a fuel source that is flowing in the intermediate fuel loop; and
selectively operating the intermediate fuel loop to store the heated fuel in a fuel accumulator, wherein the intermediate fuel loop includes a bypass line that bypasses the accumulator and the first heat exchanger and is configured to route at least a portion of the flow of fuel directly from the fuel source to a combustor, and wherein an exit of the bypass line merges with the fuel flowpath at a location upstream of a combustor,
wherein the thermal energy is transferred through a heat exchange system;
and wherein the system comprises:
the heat source for providing a flow of a first hot fluid;
the first heat exchanger in thermal communication with the flow of the first hot fluid;
the fuel source comprising a fuel tank for providing the flow of the fuel to the fuel flowpath;
the combustor fluidly coupled to the fuel tank via the fuel flowpath; and
the fuel accumulator fluidly coupled to the fuel tank and the combustor via the fuel flowpath, wherein the fuel accumulator is disposed along the fuel flowpath downstream from the fuel tank and upstream from the combustor, wherein the fuel flowpath passes through the first heat exchanger between the fuel accumulator and the combustor, wherein heat is transferred from the first hot fluid to the flow of fuel to provide the heated fuel, wherein the fuel flowpath is configured to route at least a portion of the heated fuel to the fuel accumulator, and wherein the fuel accumulator is configured to store the heated fuel.

14. The method of claim 13, wherein the heat exchange system comprises the first heat exchanger for thermal energy transfer between a thermal transport fluid comprising the first hot fluid flowing in the thermal transport loop and the fuel and a second heat exchanger for thermal energy transfer between a second hot fluid and the thermal transport fluid.

15. The method of claim 14, further comprising:
selectively operating one or more valves to control a flow of the heated fuel between a flow Ftank of the fuel to the fuel accumulator and a flow Fburn of the fuel to the fuel burn location,
wherein the second hot fluid has a heating capacity HCheat and the thermal transport loop has a heating demand Dheat, and wherein the flow of the fuel is controlled such that Ftank/Fburn>1 when HCheat>Dheat.

16. The method of claim 14, further comprising:
selectively operating one or more valves to control a flow of the heated fuel between a flow Ftank of the fuel to the fuel accumulator and a flow Fburn of the fuel to the fuel burn location,
wherein the fuel has a heating capacity HCfuel and the fuel burn location has a heating demand Dfuel, and
wherein the flow of the fuel is controlled such that Ftank/Fburn<−0.50 when Dfuel>HCfuel.

* * * * *